United States Patent [19]

Lentz et al.

[11] Patent Number: 5,070,747
[45] Date of Patent: Dec. 10, 1991

[54] ADAPTIVE POWERED DOWNSHIFT CONTROL OF AN AUTOMATIC TRANSMISSION

[75] Inventors: Carl A. Lentz, Mooresville; Jeffrey K. Runde, Indianapolis, both of Ind.

[73] Assignee: General Motors Corporation, Detroit, Mich.

[21] Appl. No.: 456,434

[22] Filed: Dec. 26, 1989

[51] Int. Cl.$^5$ ............................................. B60K 41/06
[52] U.S. Cl. ......................................... 74/866; 74/867
[58] Field of Search ................. 74/866, 871, 878, 867; 364/424.1

[56] References Cited

U.S. PATENT DOCUMENTS

| | | | |
|---|---|---|---|
| 4,220,058 | 9/1980 | Petzold | 74/866 X |
| 4,527,678 | 7/1985 | Pierce et al. | 74/866 X |
| 4,653,350 | 3/1987 | Downs et al. | 364/424.1 X |
| 4,653,351 | 3/1987 | Downs et al. | 74/866 |
| 4,724,939 | 2/1988 | Lockhart et al. | 192/3.3 |
| 4,788,890 | 12/1988 | Anderson | 74/866 X |
| 4,796,490 | 1/1989 | Butts et al. | 74/866 |
| 4,846,021 | 7/1989 | Harlans et al. | 74/866 |
| 4,905,545 | 3/1990 | Leising et al. | 74/867 X |
| 4,942,530 | 7/1990 | Boda et al. | 74/866 X |

Primary Examiner—Allan D. Herrmann
Assistant Examiner—Benjamin Levi
Attorney, Agent, or Firm—Mark A. Navarre

[57] ABSTRACT

In an automatic transmission, clutch-to-clutch powered downshifting is controlled by filling the on-coming clutch at a low pressure while ramping down the off-going clutch pressure until turbine speed is pulled up due to off-going clutch slippage, and then increasing the off-going pressure stepwise to compensate the change from static to dynamic coefficients of friction. Then the on-coming pressure is gradually ramped up and a closed-loop profile control period starts wherein the slip speed of the on-coming clutch is measured and controlled to a slip speed profile by controlling the off-going clutch pressure. When synchronization of the on-coming clutch is first detected, a closed-loop sync control period starts wherein the off-going pressure is controlled to minimize the slip and the on-coming pressure is ramped up at a steeper rate to begin clutch engagement during the sync control period. Adaptive control is accomplished for the initial on-coming pressure by an iterative process which decreases that pressure stepwise until flare occurs and then increases the pressure to stop the flare and repeating the changes in smaller steps to approach the flare condition. Initial off-going pressure is modified when early slip or late slip of the off-going pressure is detected. A modification of off-going pressure step value is effected when the final pressure in the closed-loop period is greater or smaller than the initial pressure. The modifications are targeted to fully correct the respective conditions.

12 Claims, 19 Drawing Sheets

| RANGE | CLUTCHES APPLIED | | | | |
|---|---|---|---|---|---|
| | C1 | C2 | C3 | C4 | C5 |
| FWD 1 | X | | | | X |
| 2 | X | | | X | |
| 3 | X | | X | X | |
| 4 | X | X | | | |
| 5 | | X | X | | |
| 6 | | X | | X | |
| REV 1 | | | X | | X |

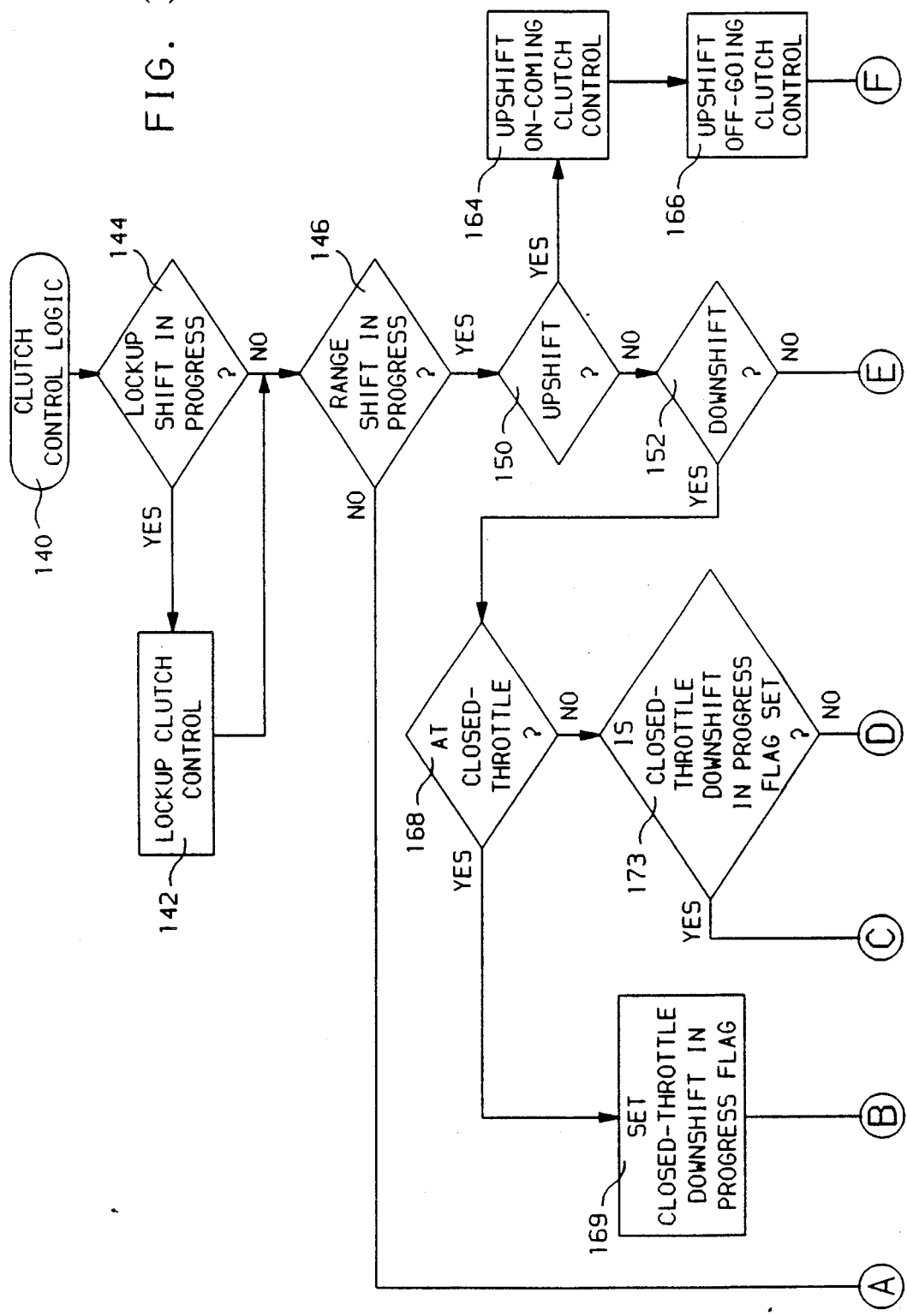

ADAPTIVE POWERED DOWNSHIFT CONTROL OF AN AUTOMATIC TRANSMISSION

FIELD OF THE INVENTION

This invention relates to a method of transmission control, and more particularly, to an adaptive method of adjusting shift parameters for a powered downshift on the basis of the quality of past shifts.

BACKGROUND OF THE INVENTION

Generally, a motor vehicle automatic transmission includes a number of gear elements coupling its input and output shafts, and a related number of torque establishing devices, such as clutches and brakes, which are selectively engageable to activate certain gear elements for establishing a desired speed ratio between the input and output shafts. The brake can be of the band type or disk type; engineering personnel in the automotive art refer to disc type brakes in transmissions as "clutches" or "reaction clutches". As used herein, the terms "clutches" and "torque transmitting devices" will be used to refer to brakes as well as clutches.

The input shaft is connected to the vehicle engine through a fluid coupling such as a torque converter, and the output shaft is connected directly to the vehicle wheels. Shifting from one forward speed ratio to another is performed in response to engine throttle and vehicle speed, and generally involves releasing or disengaging the clutch (off-going) associated with the current speed ratio and applying or engaging the clutch (on-coming) associated with the desired speed ratio.

The speed ratio is defined as the transmission input speed or turbine speed divided by the output speed. Thus, a low gear range has a high speed ratio and a higher gear range has a lower speed ratio. To perform a downshift, a shift is made from a low speed ratio to a high speed ratio. In the type of transmission involved in this invention, the downshift is accomplished by disengaging a clutch associated with the lower speed ratio and engaging a clutch associated with the higher speed ratio to thereby reconfigure the gear set to operate at the higher speed ratio. Shifts performed in the above manner are termed clutch-to-clutch shifts and require precise timing in order to achieve high quality shifting.

The quality of shift depends on the cooperative operation of several functions, such as pressure changes and the timing of control events. Certain parameters in the shift control can be recognized as key elements in determining the shift quality. The vehicle type and the engine characteristics are very important factors in the shift operation and influence the correct selection of the parameters. Moreover, manufacturing tolerances in each transmission, changes due to wear, variations in oil quality and temperature, etc., lead to shift quality degradation, which can be overcome by an adaptive scheme for adjusting the parameters whereby as the vehicle is driven, the shift quality is analyzed and the required adjustments are calculated and implemented for subsequent shifts.

Large calibration adjustments may need to be made for each shift of a newly manufactured transmission. It is important to provide the capability for the transmission control to rapidly adjust itself to its system configuration when it is first operated as well as to maintain a continuous update capability.

SUMMARY OF THE INVENTION

It is therefore an object of the invention to provide a method of adaptively controlling a powered downshift in an automatic transmission, wherein a transmission aberration during a shift is diagnosed and the method has the capability to fully (or optionally, partially) correct the operation on the next powered downshift between the same ranges.

It is a further object to provide such a method which is capable of making large corrections initially and is limited to small changes thereafter.

The invention is carried out by monitoring transmission input and output speeds during a powered downshift, and identifying departures from acceptable speed patterns and the times during the shift when the departures occur. For closed-loop control, the relationship of commanded clutch pressures is similarly monitored. Each particular type of departure calls for a particular remedy, and a suitable adjustment is calculated based on the times and/or the commanded pressures at certain times, the adjustment being implemented by changing one or more initial conditions for the next shift of the same type. The adjustments may have to be large to make a full or significant partial correction at the next shift. Once the corrections are made, large changes are inhibited and small increments are used instead.

The invention is also carried out by iteratively adjusting the initial on-coming pressure up and down to closely approach a desired pressure and periodically repeating the iteration.

BRIEF DESCRIPTION OF THE DRAWINGS

The above and other advantages of the invention will become more apparent from the following description taken in conjunction with the accompanying drawings wherein like references refer to like parts and wherein:

FIG. 1b is a diagram illustrating the clutch engagements required to establish the various speed ratios of the transmission depicted in FIG. 1a.

FIGS. 2 and 3a-3b are flow diagrams representative of computer program instructions executed by the computer based controller of FIG. 1a in carrying out the shift control of the transmission, FIG 4, graphs A and B, are graphs illustrating on-coming pressure command and off-going pressure command, respectively, for clutch-to-clutch shifting.

DESCRIPTION OF THE INVENTION

Figure 1A:
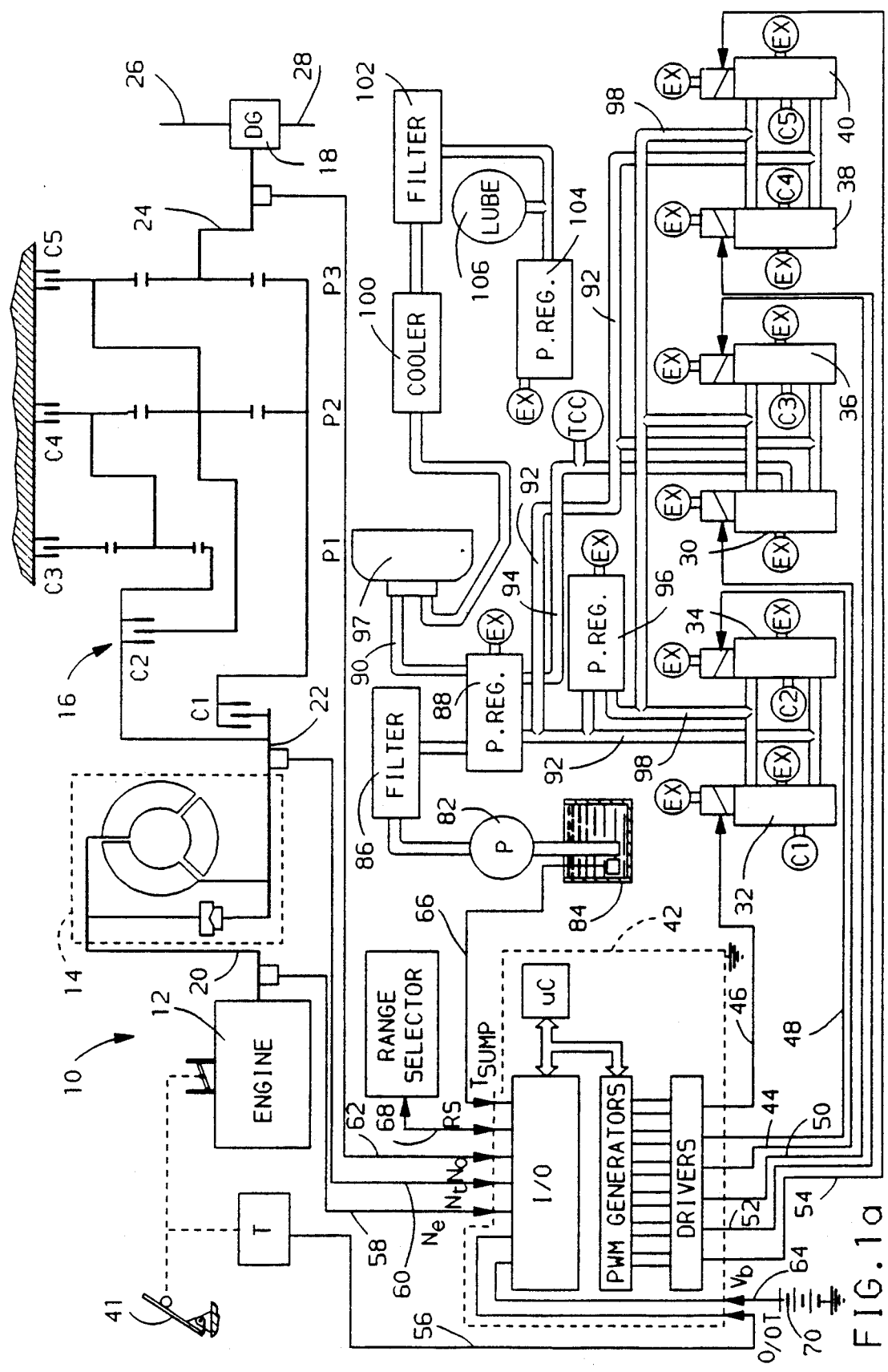
FIG. 1a is a system diagram of a fluid operated motor vehicle transmission, including several solenoid operated fluid pressure control valves and a computer-based control unit for carrying out the control technique of this invention.

Referring now to the drawings, and more particularly to FIG. 1a, the reference numeral 10 generally designates a motor vehicle drive train including a throttled internal combustion engine 12, a fluidic torque converter 14, a six-speed fluid operated power transmission 16 and a differential gear set (DG) 18. The engine 12 is connected to the torque converter 14 via shaft 20, the torque converter 14 is connected to the transmission 16 via shaft 22, the transmission 16 is connected to the differential gear set 18 via shaft 24 and the differential gearset is connected to a pair of drive wheels (not shown) via the prop shafts 26 and 28.

Gear shifts are accomplished by selectively engaging and disengaging brakes and clutches, herein called torque transmitting devices or clutches. These clutches are actuated by hydraulic pressure and upon engagement require a fill time before torque is transmitted between a driving and a driven friction element.

The speed and torque relationships between the engine 12 and the drive wheels of the vehicle are controlled by a fluid operated torque converter clutch, designated TCC, and five fluid operated transmission clutches, designated C1-C5. The torque converter clutch TCC is selectively engaged by the solenoid operated control valve 30 to mechanically connect the impeller I and turbine T of torque converter 14. The clutches TCC, C1, C2, C3, C4, C5 are selectively engaged and disengaged by the solenoid operated control valves 30, 32, 34, 36, 38, 40 according to the diagram shown in FIG. 1b, to selectively establish a desired transmission speed ratio. The illustrated transmission gear set provides one reverse ratio and six forward ratios, and is described in detail in the Polak U.S. Pat. No. 4,070,927, issued Jan. 31, 1978, and assigned to the assignee of the present invention. An operator manipulated accelerator pedal 41 positions the engine throttle for controlling the engine power output.

The operation of the solenoid operated control valves 30-40 is controlled by a computer-based control unit 42 via lines 44-54 in response to various input signals representative of system parameters. Such inputs include an engine throttle position signal %T on line 56, an engine output shaft speed signal Ne on line 58, a torque converter output shaft speed signal Nt on line 60, a transmission output shaft speed signal No on line 62, a system supply voltage signal Vb on line 64, a transmission fluid temperature signal Tsump on line 66 and an operator range selector position signal RS on line 68. The system voltage is supplied by the storage battery 70, and the input signals are obtained with conventional electrical transducers such as potentiometers, thermistors and magnetic speed pickups.

Internally, the control unit 42 comprises a number of conventional devices including a microcomputer (uC) with internal clock and memory, an input/output device (I/O) and an array of PWM generators (PWM) and drivers (DR). As indicated below, a PWM generator and a driver (DR) are dedicated to each solenoid control valve 30-40. The PWM outputs are delivered to the respective drivers (DR) and are used to energize the respective solenoid control valves. The duty cycle of the PWM outputs determine the hydraulic pressure supplied by the solenoid control valves, with a low percent duty cycle yielding a low pressure and a high percent duty cycle yielding a high pressure for a normally closed valve.

The hydraulic circuit of transmission 16 includes a positive displacement pump 82 for supplying pressurized hydraulic fluid from the sump or reservoir 84, to the clutches TCC and C1-C5 through various hydraulic and electro-hydraulic valving mechanisms. After passing through a main circuit filter 86, the fluid output of pump 82 is directed to a main pressure regulator valve 88 which develops regulated fluid pressures in lines 90 and 92.

The fluid in line 90, generally referred to as converter feed pressure, is directed through the torque converter 14, as schematically designated by the converter shell 97. After passing through a cooler 100 and cooler filter 102, the converter fluid is then regulated down to a lower pressure by the regulator valve. 104 and directed to the transmission lube circuit, as designated by the bubble 106.

The fluid in line 92, generally referred to as main or line pressure, is supplied as an input to the clutch control valves 30-40, and also to the control pressure regulator valve 96. The control pressure regulator valve 96 develops a somewhat lower pressure in line 98, referred to herein as the control pressure, such pressure being directed to the solenoid of each control valve 30-40.

The fluid in line 94, referred to as the converter clutch pressure, is supplied directly by solenoid 30 to the torque converter clutch TCC to engage the same. This pressure is also supplied to the main regulator valve 88 to provide a lower regulated line pressure in the converter lock-up mode.

Figures 1B, 2:
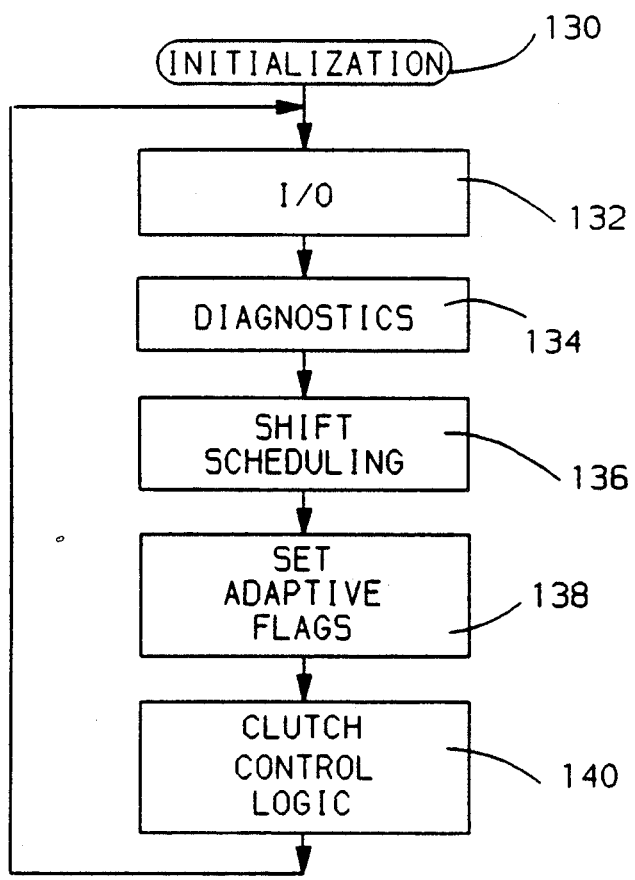

FIGS. 2, 3 and 6-11 are flow diagrams representative of computer program instructions executed by the computer-based control unit 42 of FIG. 1 in carrying out the shift control technique of this invention. In the description of the flow diagrams other than FIG. 2, the functional explanation marked with numerals in angle brackets, <nn>, refers to blocks bearing that number.

FIG. 2 represents an executive or main loop program which directs the sequential execution of various subroutines. Block 130 designates a series of instructions executed at the initiation of each period of vehicle operation for setting the various timers, registers and variable values of control unit 42 to predetermined initial values. Thereafter, the blocks 132-140 are sequentially and repeatedly executed as indicated by the flow diagram lines. Block 132 reads the various input signal values and outputs the required control signals to the PWM generators and drivers for solenoid controlled valves 30-40. Blocks 134-138 contain diagnostic, shift scheduling, and adaptive flag logic. The clutch control logic block 140 analyzes the various system input signals described above in reference to FIG. 1a, develops pressure command signals PCMD for application to the solenoid operated control valves at the next execution of block 132, and computes adaptive corrections based on the adaptive flags at shift completion. Block 140 also effects pulse-width-modulation of the solenoid drive voltage to carry out the pressure commands for specific shift operations. Block 140 is detailed in the flow chart of FIGS. 3a-3b.

Figure 3B:
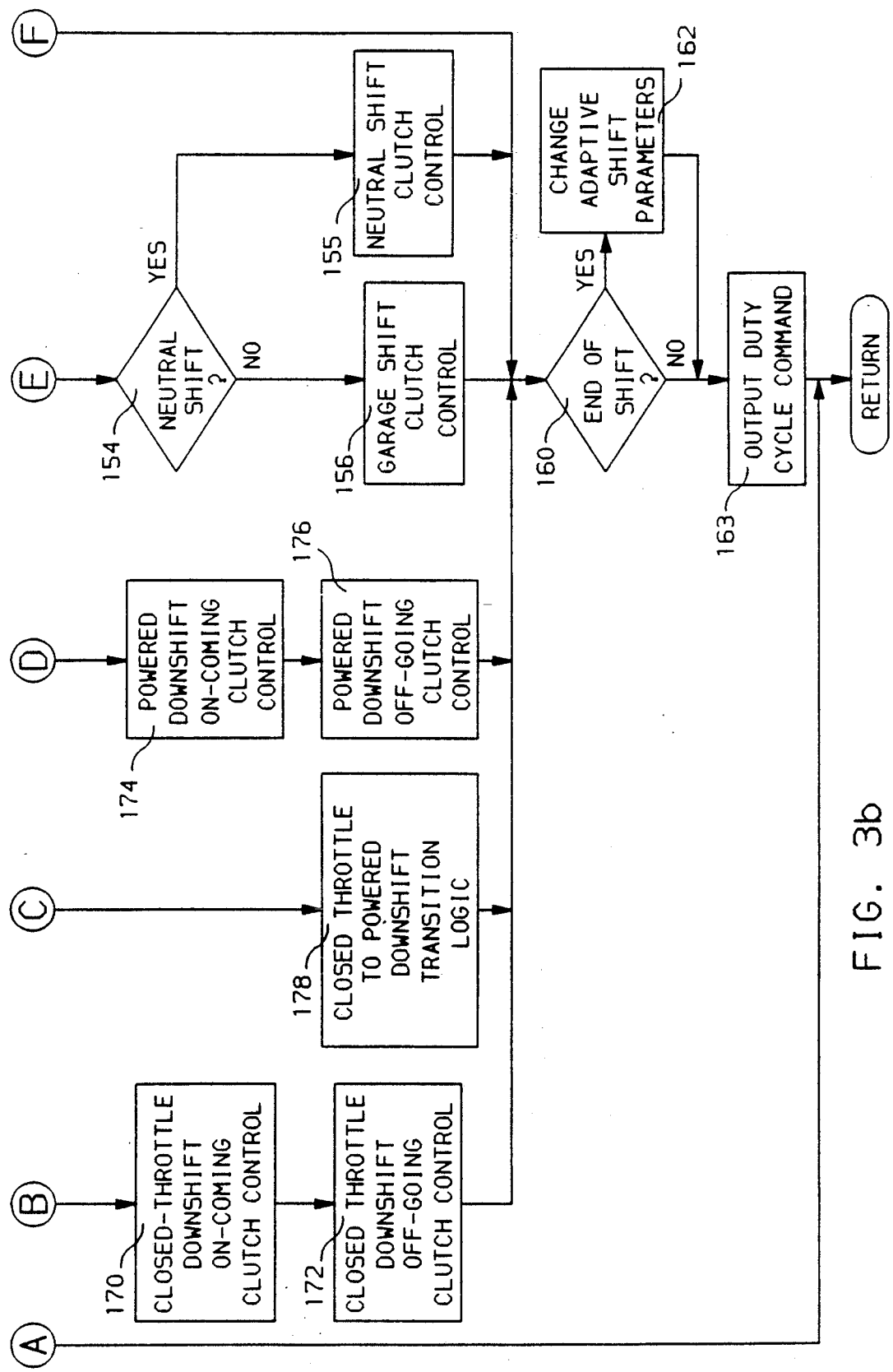

The flow diagram of FIGS. 3a-3b sets forth the program for making decisions as to the type of range shift in progress, if any, and determines the specific control for the on-coming and the off-going clutches. The program also checks whether a shift has performed within specifications, and if not, certain shift parameters are changed at shift completion according to predefined adaptive logic to correct the shift. First, lockup clutch control is executed <142> if a lockup shift is in progress <144>. Then it is determined (from the shift schedule) whether a range shift is in progress <146>. If not, the clutch control logic is exited. If a range shift is in progress <146>, it is determined whether it is an upshift <150>, a downshift <152>, a neutral shift <154>, or a garage shift <156>. A garage shift is a shift from neutral to either drive or reverse, or a shift from drive to reverse or from reverse to drive. The control flows from either the upshift, downshift, neutral shift or the garage shift block to the end-of-shift test <160>. Once the shift is completed <160>, adaptive shift parameters are changed if required <162> and the duty cycle command is output <163>. If the shift has not ended <160>, the duty cycle command is output <163> before returning to the main loop of FIG. 2.

If an upshift is indicated <150>, the upshift on-coming clutch control <164> and the upshift off-going clutch control <166> are activated. If a downshift is indicated <152>, it is next decided whether it is a closed throttle downshift or a powered downshift <168>. If it is closed throttle, a closed throttle in progress flag is set <169>, the closed throttle on-coming clutch control is activated <170> and the closed throttle off-going clutch control is activated <172>. If the downshift is not at closed throttle <168>, the closed throttle flag is checked <173>. If the flag is not set, the powered downshift on-coming clutch control <174> and the powered downshift off-going clutch control <176> are activated. If the closed throttle flag is set <173>, the throttle opened during the course of the closed throttle downshift and a transition to powered downshift may be necessary; in such case, the appropriate transition logic is invoked <178>. If the shift is a neutral shift <154>, the neutral shift clutch control executes shifts from drive to neutral or from reverse to neutral <155>.

Each control phase operates by setting pressures, pressure increments, times or other values to predefined calibrated values which are herein generally called "set", "preset", "given" or "certain" values. Each such value is chosen from a table of calibrated values for each specific transmission condition, throttle range and shift type. Thus, different values are supplied for upshift, downshift, etc. as well as each range shift, e.g., 1-2, 2-1, 4-3, 5-4, etc. Converter and lockup modes may also require separate sets of calibration values.

Figure 4:
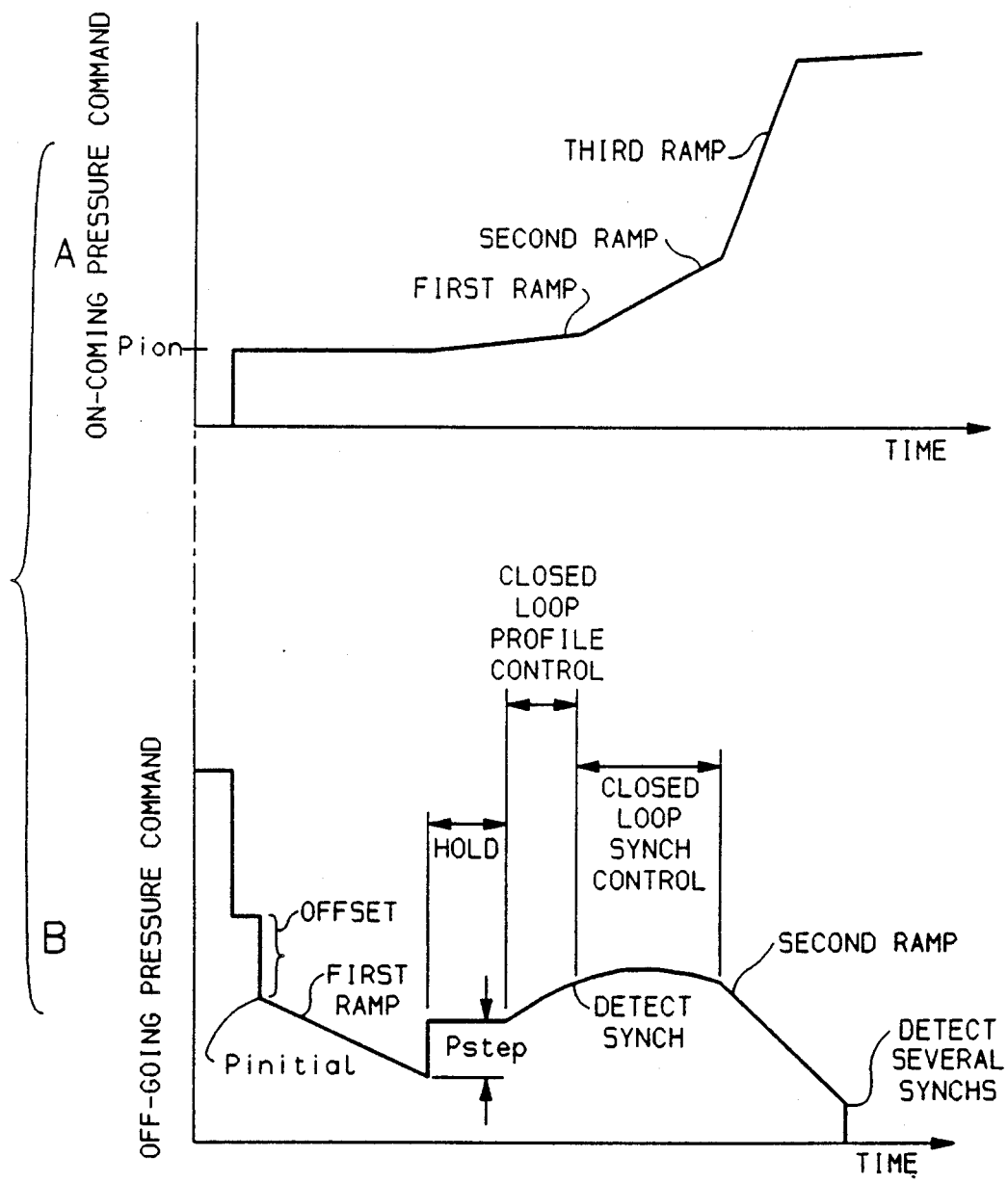

FIG. 4, graphs A and B, respectively, show the on-coming and off-going pressure commands for control of the on-coming and off-going clutches during a powered downshift. At shift initiation, the off-going clutch pressure command is stepped to an offset value for a set time, then stepped to an initial pressure value, and is then ramped downward at a programmed rate until turbine speed pullup occurs. This pullup is a result of the beginning of off-going clutch slip. Pullup is detected by the turbine speed Nt becoming greater than the product of the output speed No and the old or lower speed ratio SR(old) plus a constant K, or algebraically, $$Nt > No * SR(old) + K.$$

During this same time interval, the on-coming pressure command is set at a low "fill" pressure level to prepare for the time when the on-coming clutch must engage.

When the off-going clutch starts to slip, the coefficient of friction in the clutch changes from a static level to a dynamic level. The friction reduction and its associated decrease in clutch torque capacity is compensated for by increasing the clutch pressure in a step fashion to a level at which the torque capacity of the clutch remains nearly constant. This pressure command level is maintained for a preset hold time or until on-coming clutch synchronization (sync) has occurred. Synchronization is detected when the turbine speed equals the output speed times the new or high speed ratio, or Nt=No * SR(new). If the hold time has elapsed before on-coming clutch synchronization, the off-going clutch pressure command is determined by a closed-loop control signal which attempts to maintain on-coming clutch slip on a predefined profile. This closed-loop slip profile control continues until on-coming clutch sync has been detected. Beginning at the detected pullup and continuing through this interval of off-going clutch closed-loop control, the on-coming clutch pressure is ramped upward at a first ramp rate.

Figure 5:
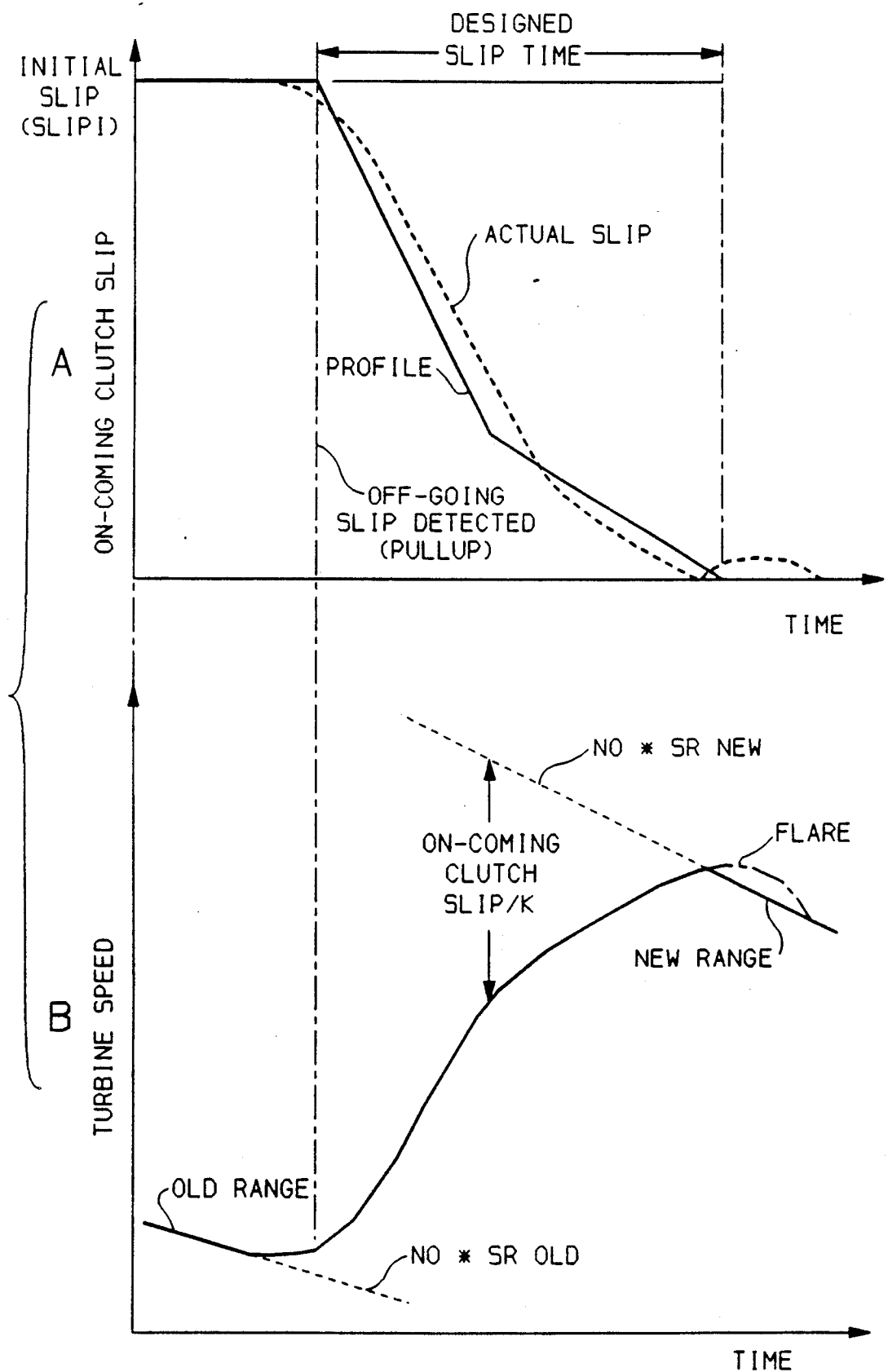
FIG. 5, graphs A and B, are a slip diagram of the on-coming clutch for the closed-loop operation of the off-going clutch and of turbine speed during the closed-loop period, respectively.

The closed-loop profile control is better explained with reference to FIG. 5, graph A, which shows the on-coming clutch slip speed profile in solid lines and actual slip speed in dashed lines. Slip speed is determined by comparing the turbine speed to the output speed. Specifically, slip speed is the absolute value of the difference (times a conversion factor K) between turbine speed and the product of the output speed and the speed ratio of the higher or new range, or algebraically, $$SLIP = ABS\{K*[Nt-(No * SR(new))]\}.$$

Thus, as soon as a shift command is issued, there is slip in the on-coming clutch. The initial slip speed, SLIPI, is the slip value at the initiation of closed loop. The slip speed profile begins at that point and decreases at a fixed rate, called the first slope. Then at a determined point, the rate reduces to a second slope. The slopes are chosen so that, ideally, the actual slip speed can be made to smoothly go to zero within a given time period. The second slope is less steep than the first slope and reduces end of shift torque disturbance by more closely matching the acceleration rates on both sides of the on-coming clutch. By using slip speed as the control target, both turbine and output speeds are taken into account when controlling the shift duration.

To determine the slopes of the slip profile, three constants C1, C2 and C3 are defined. The constant C1 is a fraction of SLIPI at which the second slope begins; i.e., if SLIP= <C1*SLIPI, the slope changes to slope 2. The constant C2 is the desired time to utilize the first slope. The constant C3 is the desired overall closed-loop time. The constants C2 and C3 are used only for the slope calculation and not for direct timing purposes. The first and second slopes SLOPE1, SLOPE2 are defined as:

$$SLOPE1 = [SLIP1 - (C1 \cdot SLIPI)]/C2;\text{ and}$$

$$SLOPE2 = C1 \cdot SLIPI/(C3 - C2).$$

The closed-loop profile control is carried out by correcting the off-going clutch command pressure by a term which is proportional to slip speed error. The effect on turbine speed is shown in FIG. 5, graph B, where pullup is detected when turbine speed increases a certain amount above the lower dashed line which represents the product of output speed and speed ratio for the old range. Thereafter the turbine speed increases in accordance with the profile control where on-coming clutch slip speed is seen to be the difference between the turbine speed curve and the upper dashed line which represents the product of output speed and speed ratio for the new range. Ideally, the slip speed converges to zero but in some conditions the turbine speed exceeds the target value and turbine flare results as shown by broken lines in graphs A and B.

Once the first snyc has been detected, a closed-loop sync control is invoked to bring the slip speed to zero by integral-plus-proportional control, thereby to maintain on-coming clutch synchronization. Simultaneously, the ramp rate of the on-coming clutch pressure command is increased to a second ramp rate which is greater than the first. This closed-loop sync control and second ramp rate continues until a preset number of additional syncs are detected. Then to complete the shift, the off-going pressure is ramped toward zero at a second ramp rate, and the on-coming pressure is increased at a third ramp rate which is greater than its second ramp rate. Control can return to the closed-loop sync control from the second off-going ramp phase if turbine flare is detected (indicating on-coming clutch under-fill).

The closed-loop sync control is an integral/proportional control algorithm using the slip speed as an error signal and correcting the off-going clutch pressure by the sum of proportional and integral terms. The second ramp rate of the on-coming clutch continues throughout this phase. Time constraints are imposed to assure that the shift does not take too long. If a set time after first sync detection expires, or if a set time after off-going clutch slip expires, the shift is completed by ramping both pressures to their final values, as though the preset number of syncs were detected.

There are some cases where the sync control phase is bypassed and shift completion directly follows the profile control phase. Two of these cases are a near-converged converter-lockup shift and a near-converged long open-converter shift. This determination depends on the adaptive control (block 162) which calculates the amount of a shift parameter change required to achieve a high quality shift (or convergence). If only a small correction is needed, the shift is "near converged". If the torque converter is in the open-converter mode and the time between slip and first sync exceeds a preset value, it is considered to be a long converter shift. In these two cases, the off-going pressure is immediately exhausted and the on-coming pressure is ramped up at the third ramp rate. Sync control is also bypassed if the time since pullup exceeds a set value. In that case, however, the off-going clutch is ramped off at the second rate instead of being immediately exhausted.

The control technique described above has several advantages over prior techniques. The low fill command pressure for the on-coming clutch is insufficient to cause torque transfer until late in the second ramp phase. This eliminates the detrimental effect on shift quality resulting from an on-coming clutch overfill at maximum pressure and allows off-going clutch control of the shift. The multiple slopes or ramp rates of the on-coming pressure command provide significant protection from shift miscalibration due to system variation. The first slope begins the clutch fill process but insures that no significant pressure is generated. The second slope completes the fill process and begins the on-coming clutch pull-in process. The third slope completes the clutch application. Fill (or compression) of the on-coming clutch occurs simultaneously with the reduction of on-coming clutch slip which is caused by the increased turbine speed permitted by the slipping off-going clutch. Consequently, the on-coming clutch is ready for application immediately upon the detection of synchronization. This shortens the holding period required for off-going clutch control and significantly reduces the energy dissipation required in the off-going clutch.

Another important feature is the off-going clutch pressure command step which follows the detection of turbine pullup. This compensates for the change from static to dynamic friction and allows the off-going clutch to gain control of the on-coming clutch pullup rate prior to initiation of the closed-loop profile control. The delay in beginning closed-loop control after the pressure command step allows the pressure to fully react to the step command before introducing additional command changes.

The use of the closed-loop on-coming clutch slip speed profile control establishes slip control before synchronization is reached and thereby brings the on-coming clutch elements to the same speed before torque transfer takes place in that clutch. The following sync control, when employed, continues to keep the clutch close to sync as the clutch engaging pressure is applied, thereby minimizing turbine speed flare and associated shift quality degradation. In addition, the slip profile itself helps to provide consistent shift timing.

Additional protection from shift miscalibration is provided by constantly monitoring turbine flare during the second ramp of the off-going clutch. If flare occurs (indicating insufficient on-coming clutch capacity), the sync control phase is reestablished. This allows additional time for on-coming clutch fill and prevents additional flare.

A key part of the powered downshift clutch control is the immediate exhaust of the off-going clutch for near-converged converter-lockup and long open-converter shifts. This significantly reduces off-going clutch heat generation due to clutch synchronization control when this task is not required to achieve desired shift quality.

Figure 6:
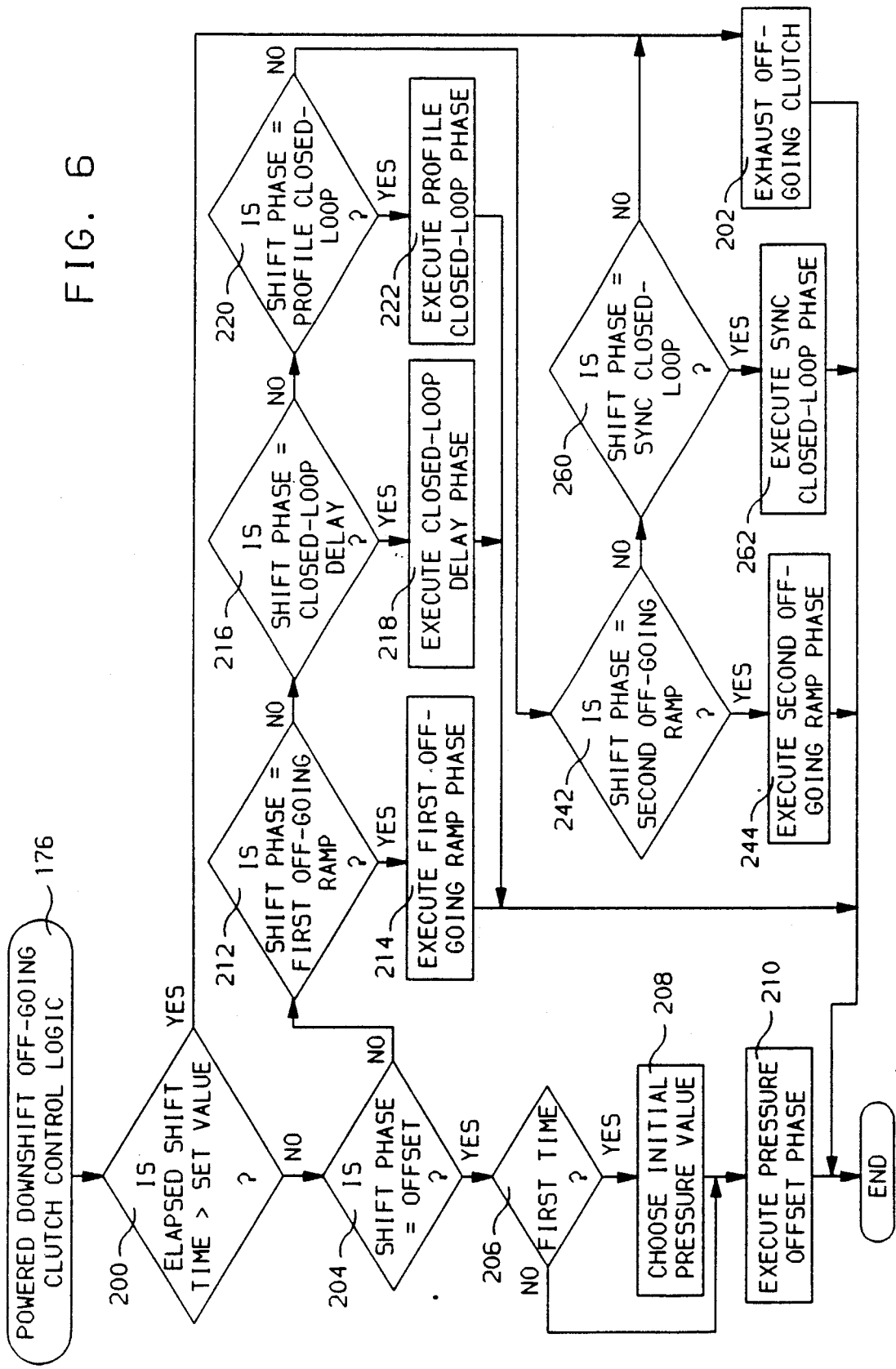
FIGS. 6 through 9 are flow diagrams illustrating the powered downshift logic for the off-going clutch.

The flow charts of FIGS. 6–10 illustrate the control logic incorporated in the program for powered downshift control. FIG. 6 shows the logic flow for the off-going clutch control <176>. First, the shift time is tested <200> and if it has expired, the off-going clutch is exhausted <202> to end the shift. If the time has not elapsed, SHIFT PHASE is examined. SHIFT PHASE is a pointer indicating the stage of shift progress. If the SHIFT PHASE is OFFSET <204>, and the loop is run for the first time <206>, an initial pressure value, Pinitial, is set <208>. If not, block 208 is bypassed. Next, the pressure offset phase is executed <210>. In the offset phase, if the time since shift initiation does not exceed a set value, the off-going pressure command is set equal to the chosen initial pressure plus an offset amount, Pinitial+Offset. If the time does exceed that value, the off-going pressure command is set to the chosen initial pressure and SHIFT PHASE is set to FIRST OFF-GOING RAMP.

If SHIFT PHASE is FIRST OFF-GOING RAMP <212>, the FIRST OFF-GOING RAMP routine is executed <214>. In that routine, the off-going pressure command is decremented by a preset value. If turbine pullup is then detected, the off-going pressure command is increased by a step amount and SHIFT PHASE is set to CLOSED-LOOP DELAY.

If SHIFT PHASE is CLOSED-LOOP DELAY <216>, the CLOSED-LOOP DELAY routine is executed <218>. There, the off-going pressure command is held at its last value. The closed-loop slip speed profile is computed, and, when either a given time has elapsed or one sync (or oversync) is detected, SHIFT PHASE is set to PROFILE CLOSED-LOOP.

Figure 7:
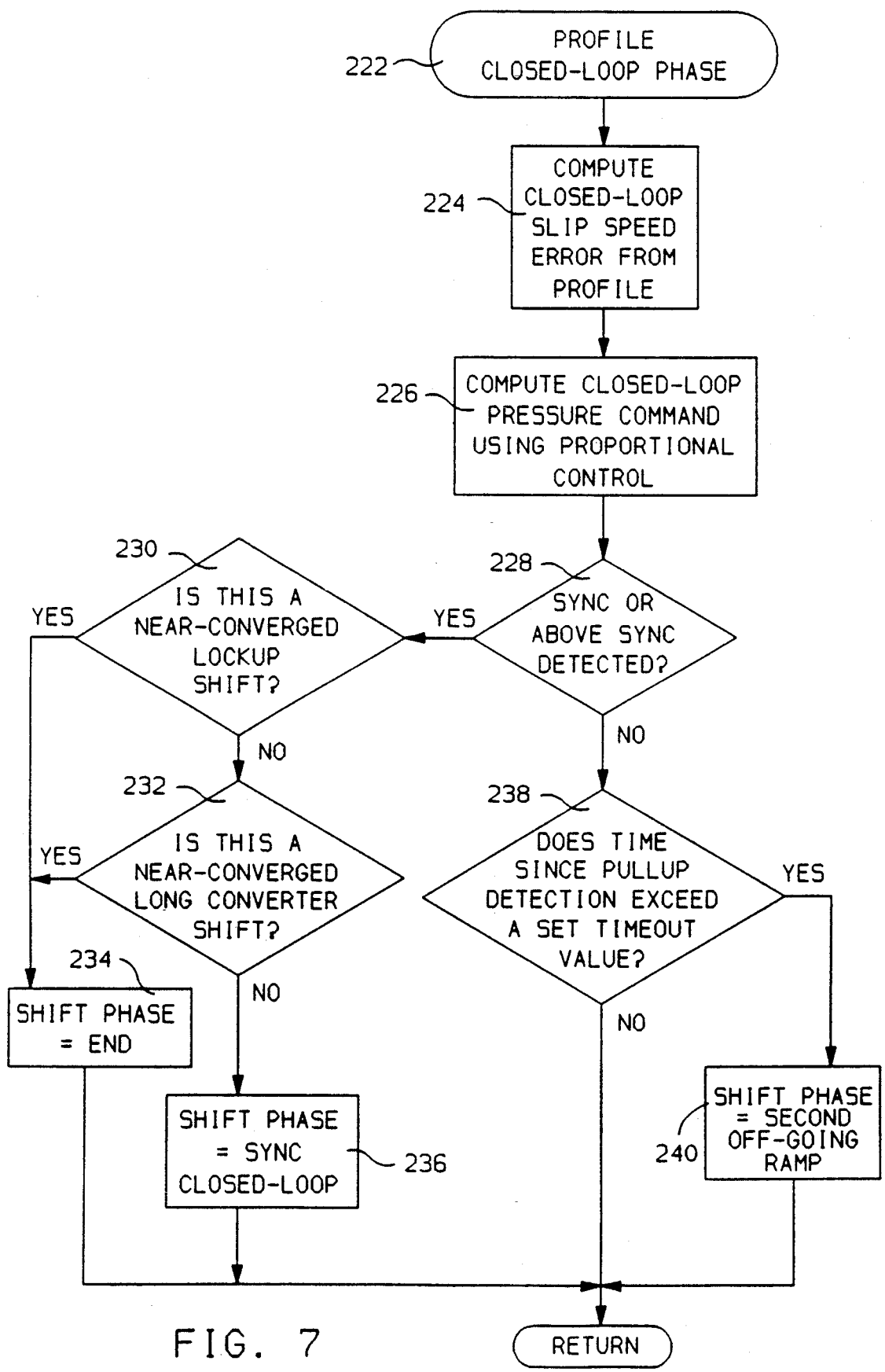

If SHIFT PHASE equals PROFILE CLOSED-LOOP <220>, the PROFILE CLOSED-LOOP routine is executed <222> as shown in FIG. 7. The slip speed error is calculated from the profile (FIG. 5) <224> and closed-loop pressure command is computed using proportional control <226>. If sync or a value above sync is detected <228>, and if the shift is a near-converged lockup shift <230> or a near-converged long converter shift <232>, SHIFT PHASE is set to END <234>. Otherwise, SHIFT PHASE is set to SYNC CLOSED-LOOP <236>. If sync (or oversync) is not detected <228>, and the time since pullup detection exceeds a set TIMEOUT value <238>, SHIFT PHASE is set to SECOND OFF-GOING RAMP <240>.

Figure 8:
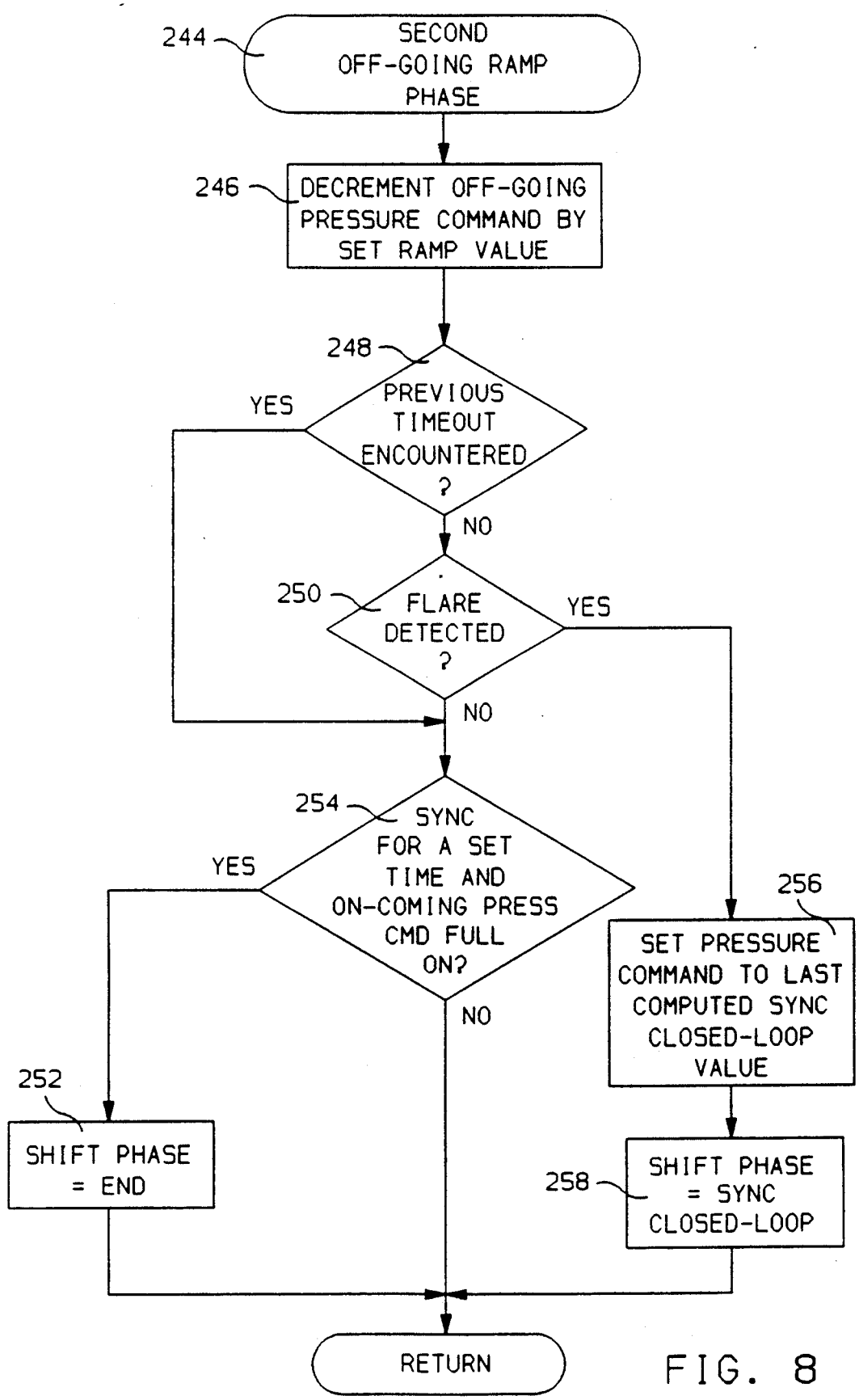

If SHIFT PHASE is SECOND OFF-GOING RAMP <242>, the SECOND OFF-GOING RAMP routine is executed <244>, as shown in FIG. 8. The off-going pressure command is decremented by a set amount <246> each time through the loop. If a previous TIMEOUT has been encountered <248>, or if no flare is detected <250>, SHIFT PHASE is set to END provided sync has been detected for a certain time and the on-coming pressure command is full on <254>. If turbine flare is detected <250>, the off-going pressure command is set to the last computed sync closed-loop value <256> and SHIFT PHASE is set to SYNC CLOSED-LOOP <258>.

Figure 9:
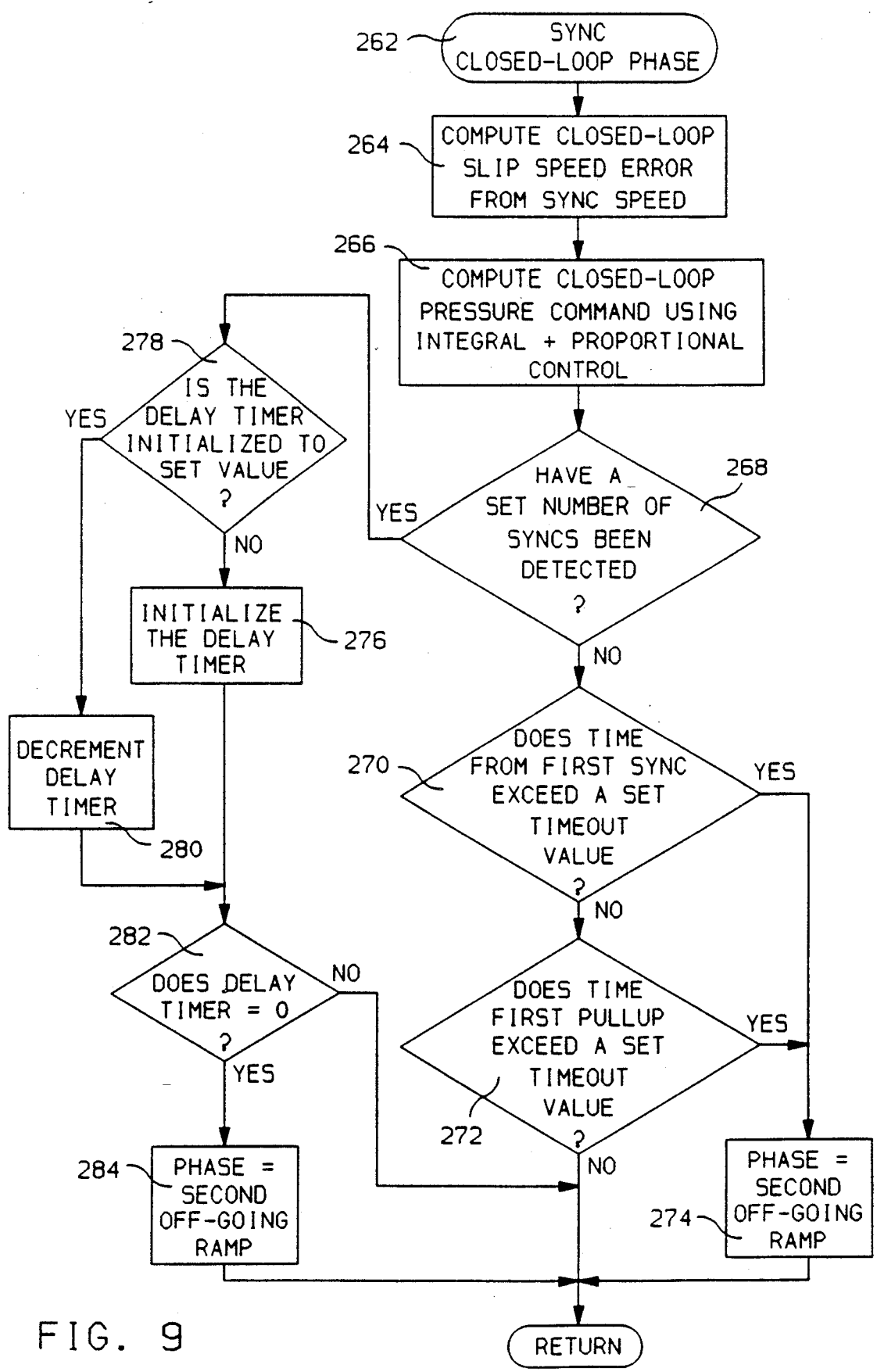

If SHIFT PHASE is SYNC CLOSED-LOOP <260>, the SYNC CLOSED-LOOP routine is executed <262> as shown in FIG. 9. The closed-loop slip speed error is computed from sync speed <264> and the pressure command is computed using integral/proportional control <266>. If a certain number of sync signals (not necessarily consecutive) have not been detected <268>, it is determined whether a time from first sync <270> or a time from pullup <272> have timed out. If not timed out, the routine repeats but if either has timed out, SHIFT PHASE is set to SECOND OFF-GOING RAMP <274>. If the required number of syncs have been detected <268>, a delay timer is initialized <276>, or if already initialized <278>, it is decremented <280>. Then if the delay timer times out <282>, SHIFT PHASE is set to SECOND OFF-GOING RAMP <284> and if not timed out the loop repeats.

Figure 10:
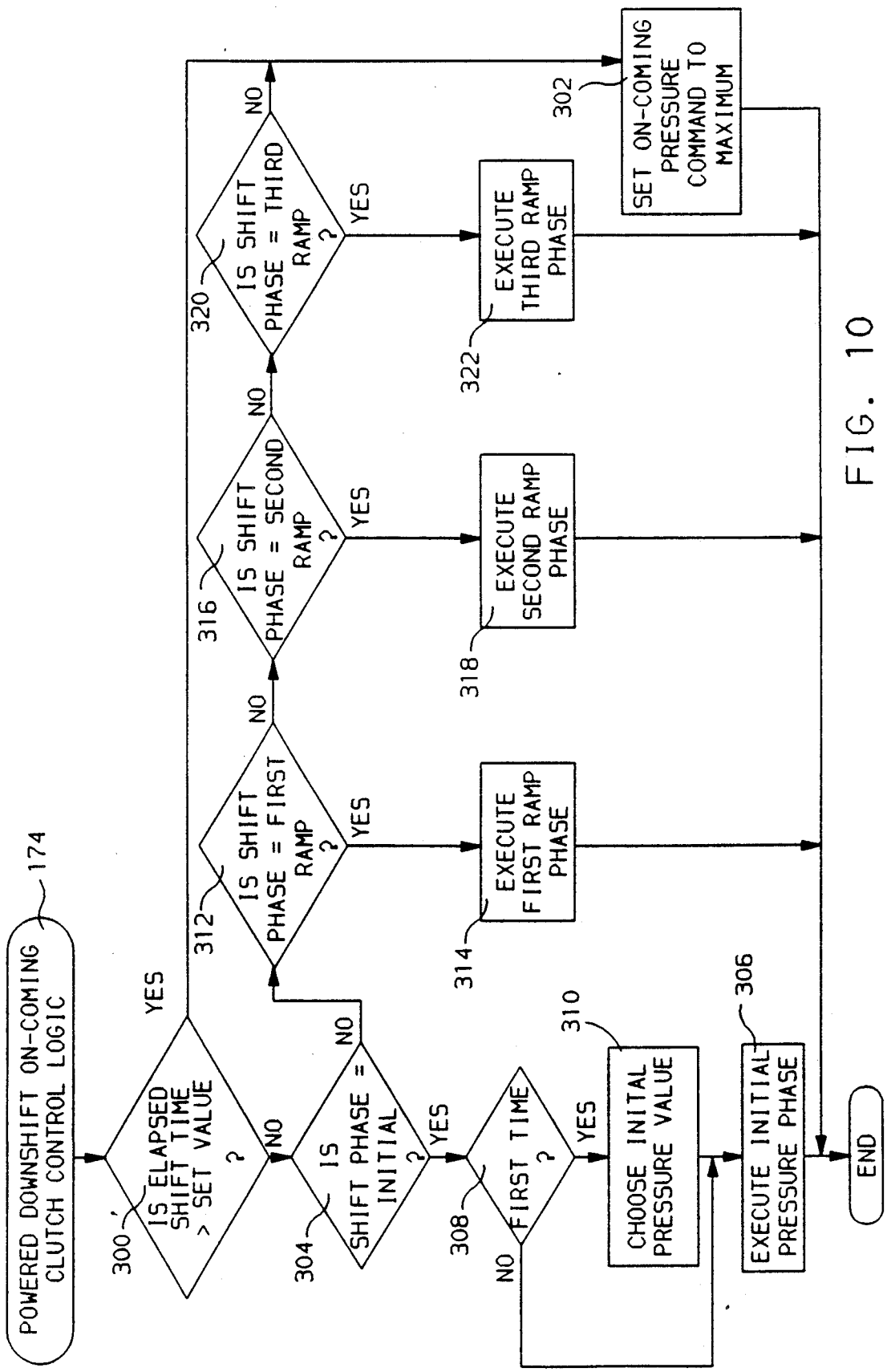
FIG. 10 is a flow diagram illustrating the powered downshift logic for the on-coming clutch.
Figure 11A:
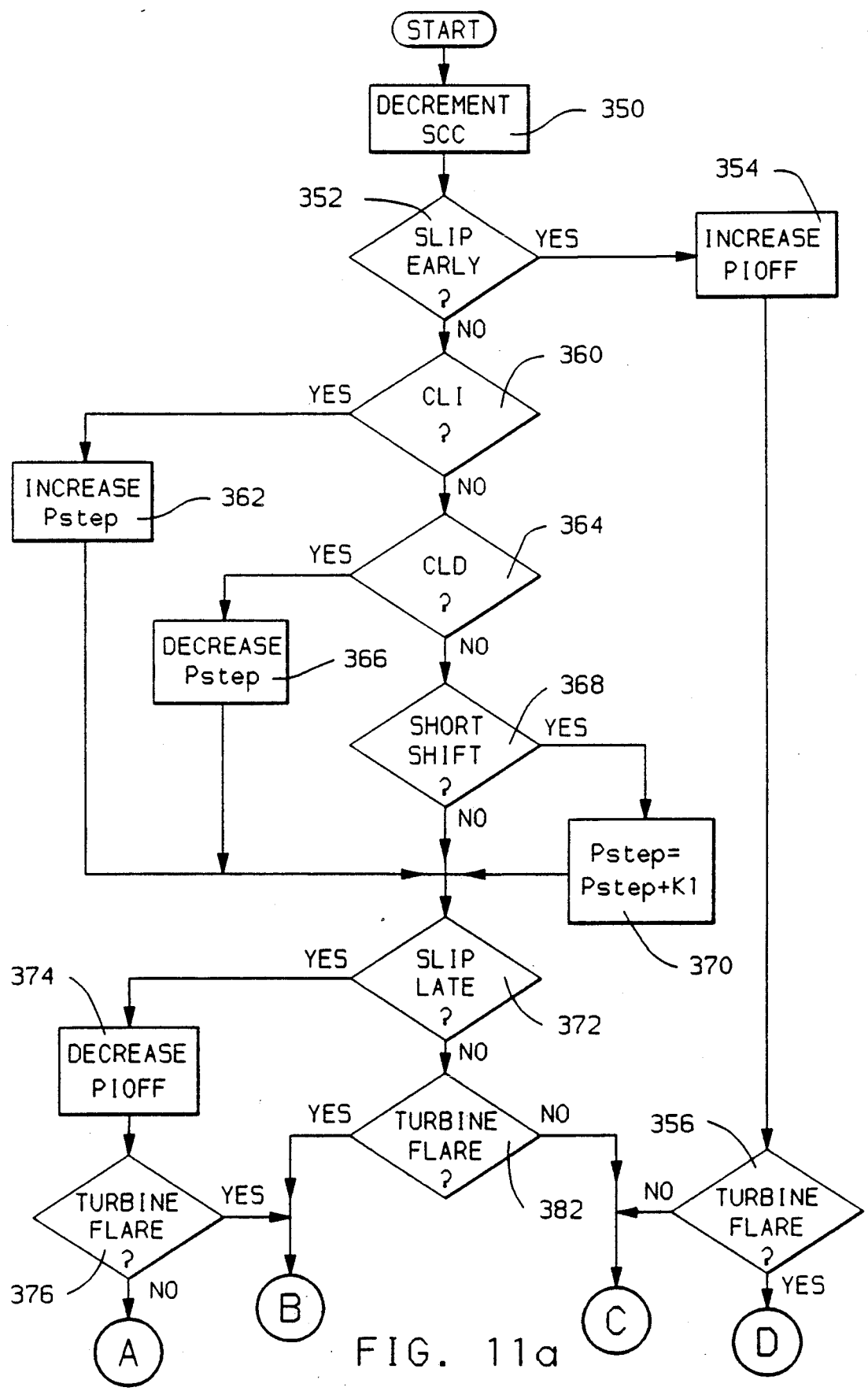
FIGS. 11a-11b are a flow diagram of the main adaptive logic for powered downshift, according to the invention.
Figure 11B:
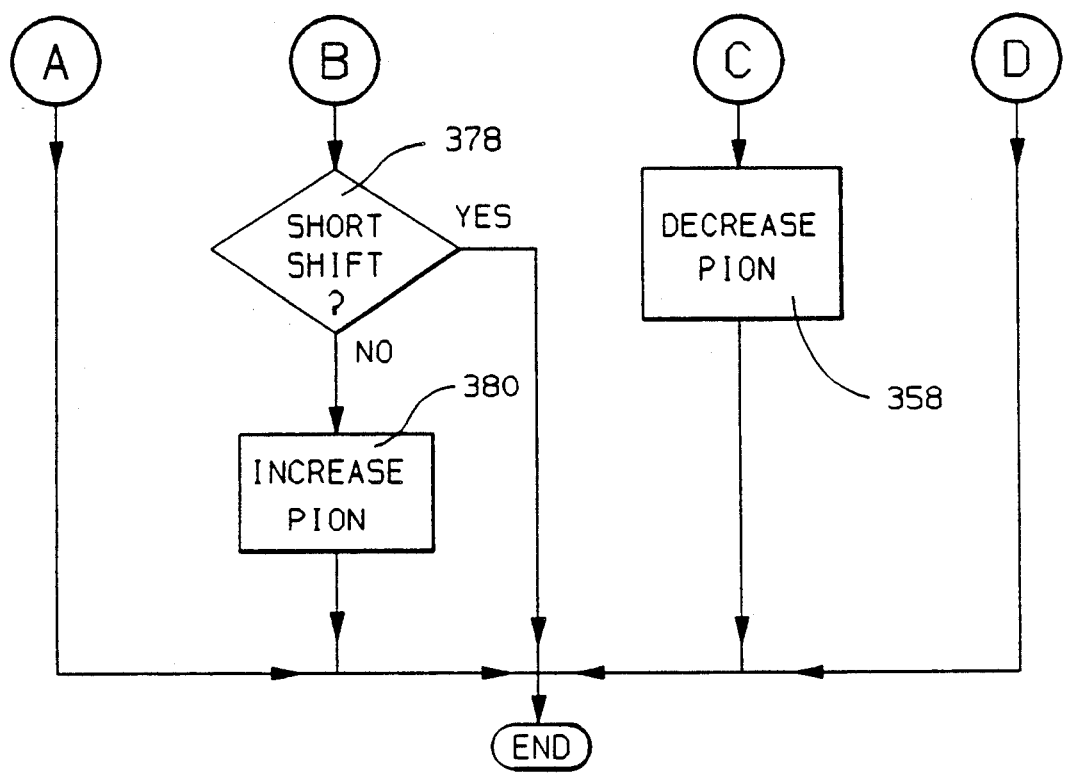

The powered downshift on-coming clutch control logic program 174 is shown in FIG. 10. If the shift time exceeds a preset limit value <300>, the on-coming pressure command is set to its maximum value <302> to assure immediate completion of the shift.

If the SHIFT PHASE is equal to INITIAL PRESSURE <304>, the INITIAL PRESSURE routine is executed <306>. If it is the first time through the routine <308>, initial pressure and other parameters are chosen based on throttle value and shift type <310>. In this and the subsequent routines, tables of calibrated values may be prepared for various throttle and transmission conditions so that the optimum pressure, pressure increment or time can be selected. The initial pressure routine sets the pressure command to an initial pressure value. The pressure command does not change as the loop repeats unless pullup is detected or the off-going pressure command equals zero. In those events, SHIFT PHASE is set to FIRST RAMP and first ramp increment is chosen based on transmission mode (lockup or converter).

If the SHIFT PHASE equals FIRST RAMP <312>, the FIRST RAMP routine is executed <314>. There the on-coming pressure command is incremented by the chosen increment value each time through the loop. If on-coming clutch sync or an above sync condition is detected, SHIFT PHASE is set to SECOND RAMP and the pressure increment is chosen for the second ramp.

If the SHIFT PHASE equals SECOND RAMP <316>, the SECOND RAMP routine is executed <318>. There the pressure command is incremented by the chosen value each time through the loop. If (1) a given number of syncs are detected, (2) the time from pullup exceeds a set value, or (3) the time from sync exceeds another set value, SHIFT PHASE is set to THIRD RAMP and the third ramp pressure increment is chosen.

If the SHIFT PHASE equals THIRD RAMP <320>, the THIRD RAMP routine is executed <322>. In that routine the on-coming pressure command is incremented by the chosen value. If the maximum on-coming pressure is commanded and sync has been detected for a given time the shift is completed.

ADAPTIVE CONTROL

Adaptive control adjusts certain parameters for each type of shift independently of other types. That is, a 2–1 powered downshift is treated separately from a 4–3 powered downshift, and the shift quality of each is separately monitored and the parameters for each type are individually adjusted and stored. The process of adapting the parameters for a particular type of shift is on-going and proceeds during each shift of that type independently of the other types of shifts.

At the end of each completed shift, the block 162 of FIG. 3b sets adaptive conditions. This is accomplished in three phases: diagnosing the shift to identify shift aberrations which are generally recognized through input and/or output speed aberrations, determining whether fast or slow adaptive adjustment is permitted, and calculating new parameter values for the next shift. If fast adapt is permitted, a parameter value is calculated which is generally targeted to fully correct the aberration in the next shift or if slow adapt is required, changing the existing parameter by a set increment. The system is capable of being programmed to make a partial correction in the fast adaptive mode, and this is sometimes employed to avoid a possible "over correction".

The distinction between fast and slow adaptive adjustment is based on the need to make potentially large adjustments when a new or rebuilt transmission is initially operated in a given vehicle/engine combination as opposed to the need to make small updates due to clutch plate wear, engine performance degradation, oil viscosity degradation and the like during the life of the transmission. Initially, the electronic control is set to make fast adaptive adjustments for each type of shift. As soon as all the parameters are correctly adjusted for that type of shift, as evidenced by a shift wherein no aberrations are detected, the shift calibration is said to be "converged" to an optimal solution and a memory flag is set to control future shifts of that type to the slow adaptive mode. Once the control enters the slow mode, it is assured that a misleading speed signal caused by system noises can not trigger a large adjustment when little, if any, adjustment is appropriate.

In the case of initial on-coming pressure, however, flare occurs when pressure is low but there is no convenient diagnosis available for the pressure being too high. Here, the pressure is decreased in steps until flare occurs and then the pressure is increased by a set amount and again decreased in smaller steps. This procedure is continued with progressively smaller steps. Thus, an iterative adaptive correction process is used to control that pressure value instead of a full correction in one step.

The diagnosis of shift aberrations is accomplished by monitoring key shift quality indicators during the shift and setting a memory flag whenever a certain speed change occurs under given conditions, a certain change of command pressure takes place, or certain corrective action has already been taken. Thus, the shift pattern of the transmission is embodied in these indicators. Then, by a logical assessment of the states of the several flags, the presence of a given aberration is detected and a suitable adjustment can then be calculated.

ADAPTIVE FLAGS

SLIP EARLY: Off-going clutch slip is detected within a set time from shift initiation for a given number of times.

SLIP LATE: Off-going clutch slip is not detected within a set time from shift initiation.

TURBINE FLARE (Short Converter Shift): During converter mode, time from slip to first detection of sync or past sync is less than a constant value. In this condition, flare is detected after a set number of nonconsecutive syncs or past syncs have been achieved.

TURBINE FLARE (Long Converter or Lock-Up Shift) In the absence of the short converter shift condition or for lock-up mode, flare is detected after the first sync or past sync has been achieved.

CLOSED-LOOP INCREASE: A closed-loop increase occurs when $Pfinal - Picl - Poffset > Pcli$, where
- Picl = The initial closed-loop clutch pressure.
- Pfinal = The final closed-loop clutch pressure. For short converter shifts, the pressure is measured at the end of the sync control period. For long converter or lock-up shifts, the pressure is measured at the first sync or past sync.
- Poffset = A constant to define a programmed amount of closed-loop change.
- Pcli = A constant to define the amount of closed-loop change required to flag a closed-loop increase.

CLOSED-LOOP DECREASE: A closed-loop decrease occurs when $Pfinal - Picl - Poffset < Pcld$, where

- Pcld = A constant to define the amount of closed-loop change required to flag a closed-loop decrease.

SHORT SHIFT: Time from first slip to first sync or past sync is less than a set value (different from the value used to determine the short converter shift).

FAST ADAPT MODE: A memory flag which indicates that the shift calibration has not converged to an optimal solution.

ADAPTIVE LOGIC

A powered downshift is adapted by adjustment of the initial on-coming pressure, Pion, the initial off-going pressure, Pioff, and an off-going step pressure, Pstep. The adjustment of each is undertaken in accordance with the flag settings as set forth in the flow diagram of FIGS. 11a-11b. First, a shift cycle counter, SCC, is decremented <350>. A separate counter is used for a powered downshift to each range. Then if the SLIP EARLY flag is set <352>, indicating that the pressure on the off-going clutch is too low, the Increase Pioff routine is executed <354>. If the TURBINE FLARE flag is set <356>, the program ends, but if it is not set, the Decrease Pion routine is run <358> to decrease the initial on-coming pressure.

If the SLIP EARLY flag is not set <352> and there is a closed-loop increase (CLI) <360>, the Increase Pstep routine is run <362> to increase the starting pressure of the closed-loop. If there is a closed-loop decrease (CLD) <364>, the Decrease Pstep program is run <366>. If the CLD flag is not set and there is a SHORT SHIFT flag <368>, Pstep is set to Pstep+K1 <370> to increment the step pressure by a small amount.

If the SLIP LATE flag is set <372>, the Decrease Pioff routine is run to lower the initial off-going clutch pressure <374>. Then, if there is no turbine flare <376>, the program ends; if there is flare, and the SHORT SHIFT flag is not set <378>, the Increase Pion routine is run <380>. If the SLIP LATE flag is not set <372> and there is no turbine flare <382> the Decrease Pion routine <358> is run; if there is turbine flare <382>, the program flows to the Short Shift block 378, as in the case of SLIP LATE with flare.

Figure 12:
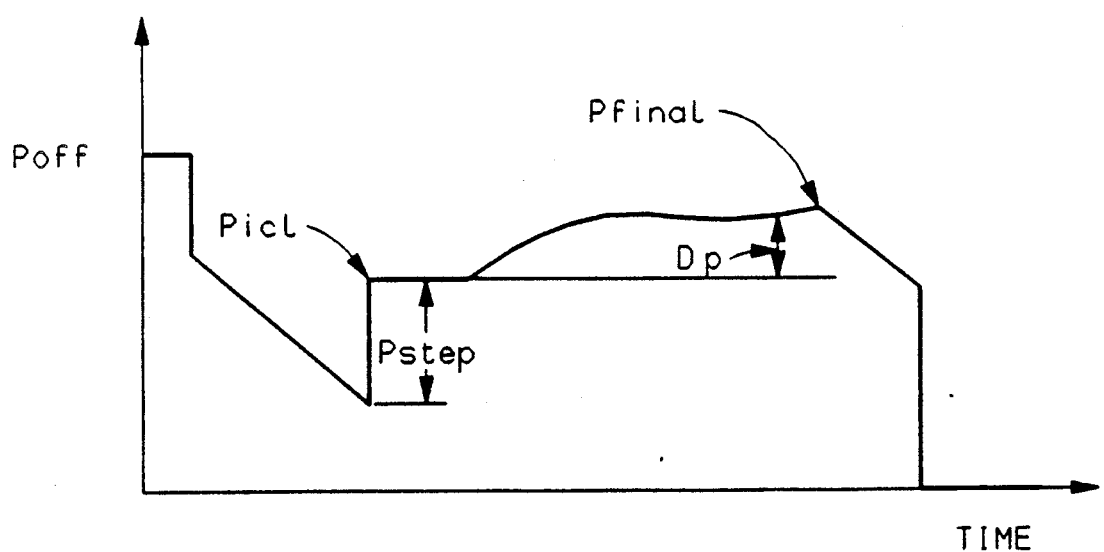
FIG. 12 is a graph illustrating the closed-loop increase of pressure for the off-going clutch.
Figure 13:
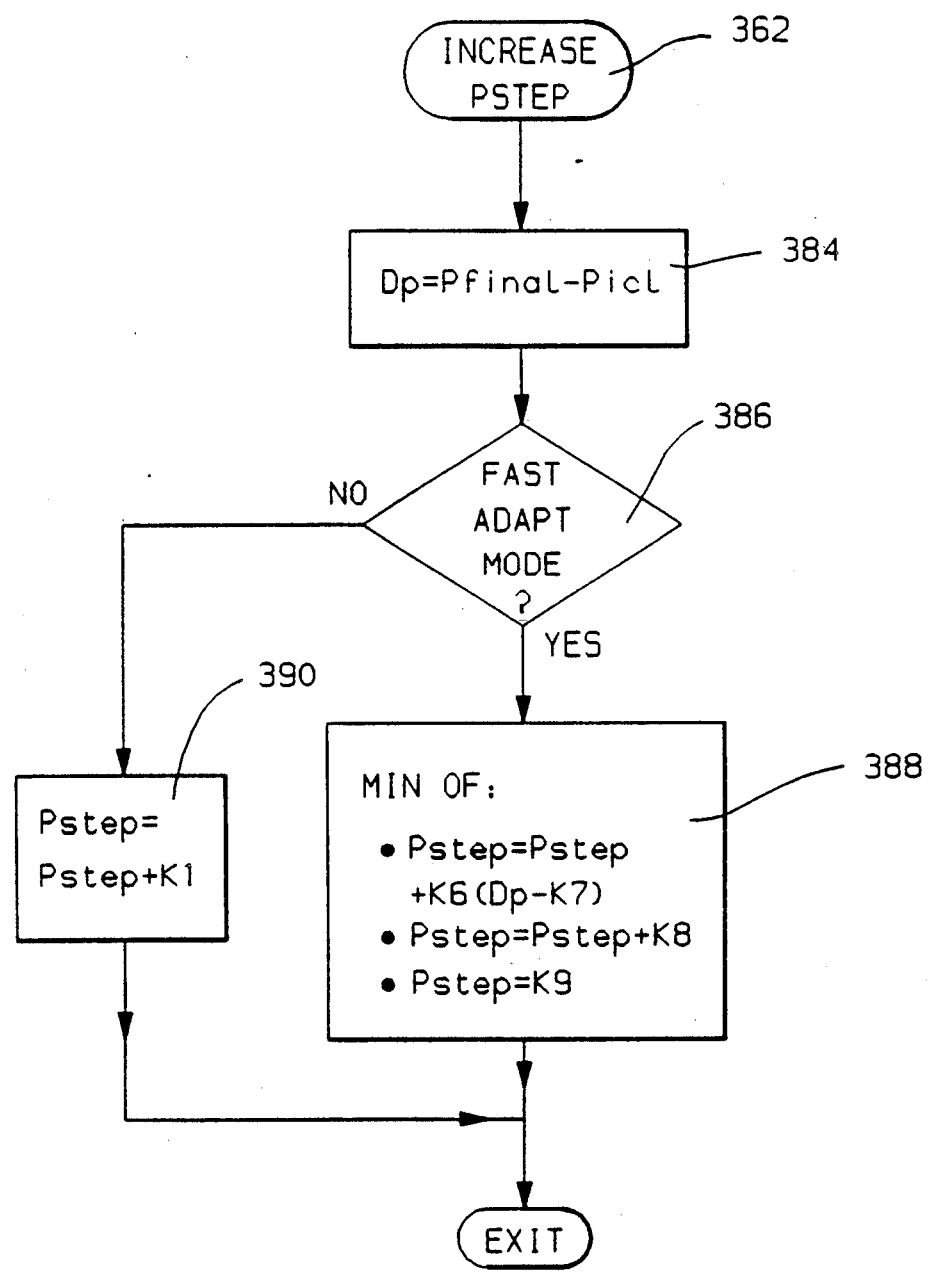
FIG. 13 is a flow diagram of adaptive logic to increase the initial step pressure, according to the invention.

FIG. 12 illustrates the closed-loop increase condition in the off-going clutch. In the illustration, the closed-loop control begins immediately after the pressure step Pstep (which sets the initial closed-loop pressure Picl) and ends at Pfinal. The difference $Dp = Pfinal - Picl$ is positive if there is no offset as described below. The Increase Pstep routine, as shown in FIG. 13, uses predetermined constants K1 for a slow adaptive change, K6 for percentage of the increase Dp to be added to Pstep, K7 for an offset pressure to which the adaptive algorithm is programmed to converge, K8 for the maximum increase allowed, and K9 for the maximum value for Pstep. As set forth in block 388, Pstep is updated to the minimum of:

$Pstep + K6 * (Dp - K7)$, $Pstep + K8$, or $K9$.

For the closed-loop algorithm used by the power downshift clutch control logic, the pressure command will be driven to a value that yields a constant error to the commanded clutch slip speed profile when Pstep is uncalibrated. It can be shown that if the step pressure command is adjusted by the amount of the error Dp as shown by the equation above, the result will yield a shift with zero error relative to the commanded clutch slip speed profile. The offset value, K7, will allow the adaptive algorithm to converge to a solution where the closed-loop pressure change Dp will be equal to K7. This will allow a preset amount of increase or decrease to be programmed to the closed-loop pressure response if desired.

In FIG. 13 the Increase Pstep routine 362 first calculates the value of Dp <384>. If the FAST ADAPT MODE flag is set <386> the value of Pstep is selected <388> as described above. If the FAST ADAPT MODE flag is not set <386>, the slow adapt constant K1 is used to increment the step and $Pstep = Pstep + K1$ <390>. The Decrease Step routine <366> is essentially the same except that different constants are used. In that case, the value of Dp will be negative, provided the offset pressure K7 is zero.

Figure 14:
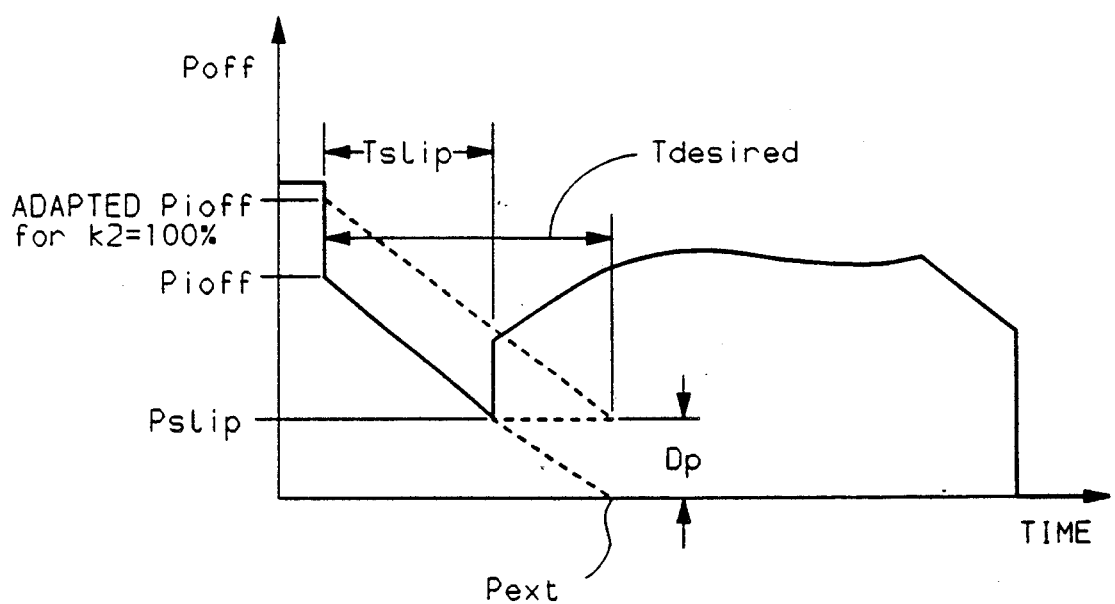
FIG. 14 is a graph illustrating the adaptive increase of initial off-going pressure.

Off-going pressure is adapted up or down according to the detection of SLIP EARLY or SLIP LATE, respectively. A slip early condition is illustrated in FIG. 14. By knowing the actual time of slip detection, the slope of the off-going clutch pressure command, and the desired time of slip detection (Tdesired), a required increase in Pioff may be computed. The term Pext is extrapolated from the open loop off-going ramp to the time Tdesired. The pressure command for the time Tslip at which slip is detected is Pslip. The difference Dp is defined as (Pslip−Pext).

The increase Pioff routine 354 is capable of increasing Pioff by the amount Dp so that the new off-going ramp command will reach Pslip at the time Tdesired. If K2 is the percentage of the calculated increase Dp to be added to Pioff, and K3 is the minimum increase in Pioff for the fast adaptive algorithm, the adapted value of Pioff is the maximum of:

$Pioff = Pioff + K2 * Dp$, and $Pioff = Pioff + K3$.

If the FAST ADAPT MODE flag is not set, the slow adapt calculation $Pioff = Pioff + K1$ will be used.

The Decrease Pioff routine 374 is essentially the same except the value Pext does not have to be extrapolated since Tdesired occurs during the commanded ramp. In this case, Pext is simply the command pressure occurring at Tdesired.

The adapted values for Pstep and Pioff are targeted to correct the aberration in one shift period if the percentage values, e.g. K2 and K6, are set to 100%. Smaller percentage values may be chosen where desired.

On the other hand, the adaptive adjustment for Pion employs an iterative process wherein Pion is increased by the step amount Ds when the FLARE flag is set and decreased when FLARE is not set. The calibration constants used with this process are:

K14 = the increase pressure scale factor;
K15 = the minimum pressure change value;
K16 = the pressure increase after convergence;
K17 = the initial valve of SCC; and
K18 = the delta pressure scale factor.

Figure 15:
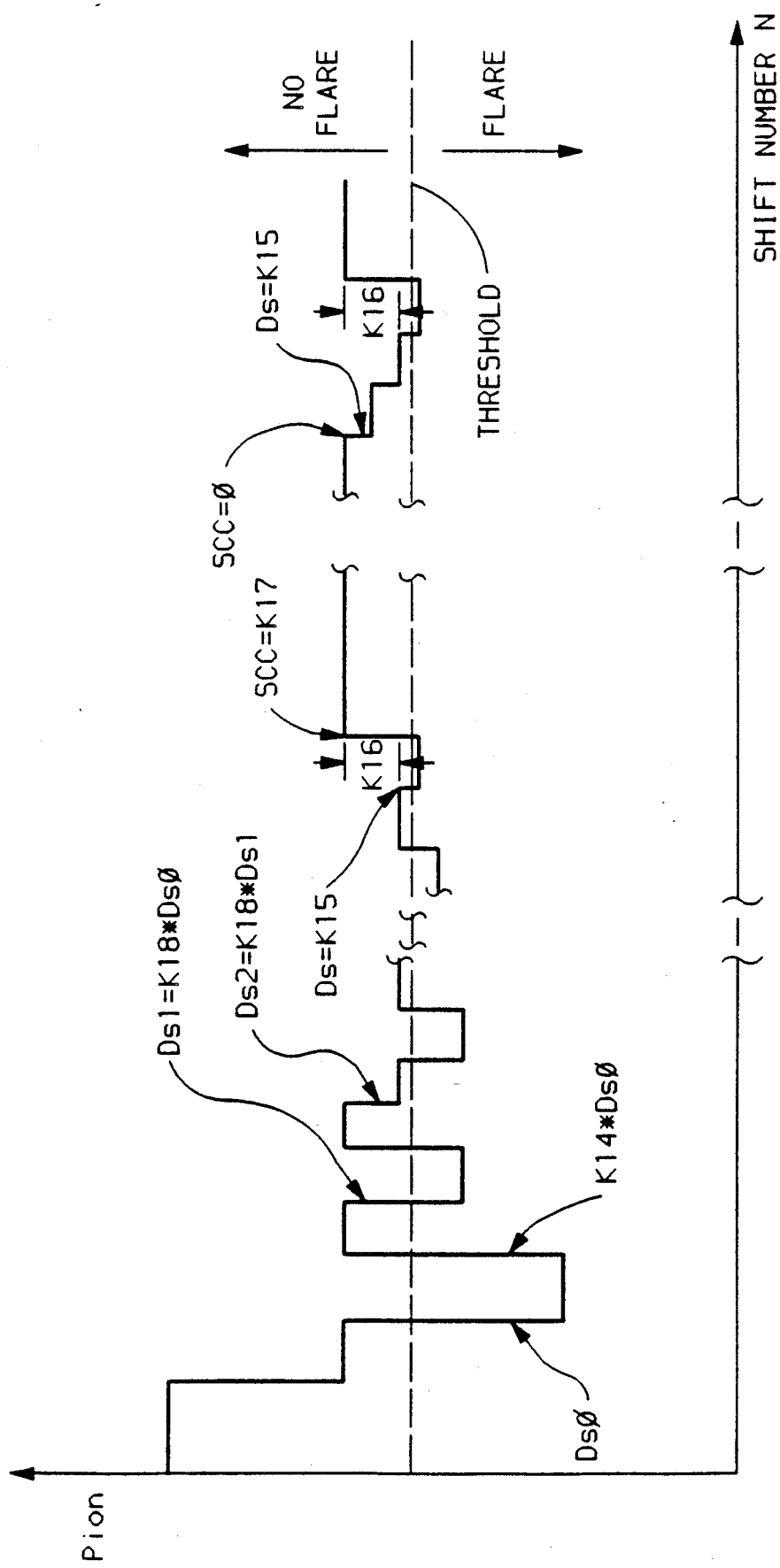
FIG. 15 is a diagram illustrating an iterative process of modifying the initial on-coming pressure, according to the invention.

The iterative process is illustrated in FIG. 15, which is a diagram of Pion versus shift number. Depending on operating conditions, there exists an value of Pion below which flare will occur. The object is to quickly adjust Pion close to that value and to maintain it there. In the fast adjustment phase, starting with a relatively high value of Pion (no flare), the pressure Pion is adjusted in each shift. First, it is reduced by relatively large steps Ds0 until flare is reached, and then it is increased by a step (K14 * Ds0) to return to a no flare condition. In the illustration, the factor K14 is unity and the increase is the same size as the last decrease. Then the step size is reduced by the scale factor K18 to Ds1 and the pressure is again reduced, the process repeating, hunting about the flare/no flare threshold with successively smaller steps until the step size reaches a limit value K15. The step size progression is Ds1 = K18 * Ds0, Ds2 = K18 * Ds1, etc. This achieves rapid convergence to the desired value near the threshold pressure.

Once the threshold pressure is achieved, a maintenance phase is initiated in which Ds is increased by a small value K16 and the shift cycle counter SCC is set to a value K17. SCC is decremented by one during subsequent shifts of the same kind until it reaches zero; in the meantime, Pion is maintained constant. When SCC reaches zero, step decreases of K15 are employed to reinitiate flare. Then Pion is again increased by K16, SCC is reset, and the maintenance phase is repeated. Thus, the hunting is permitted only occasionally to assure that the pressure is just above the flare condition.

It should be noted that in FIG. 11, turbine flare is always tested <376, 382, 356> each time through the program and Pion is increased <380> or decreased <358> except for two cases: early slip and turbine flare, and late slip and no flare. Thus, the Decrease Pion routine and the Increase Pion routine work together to carry out the iteration shown in FIG. 15.

Figure 16:
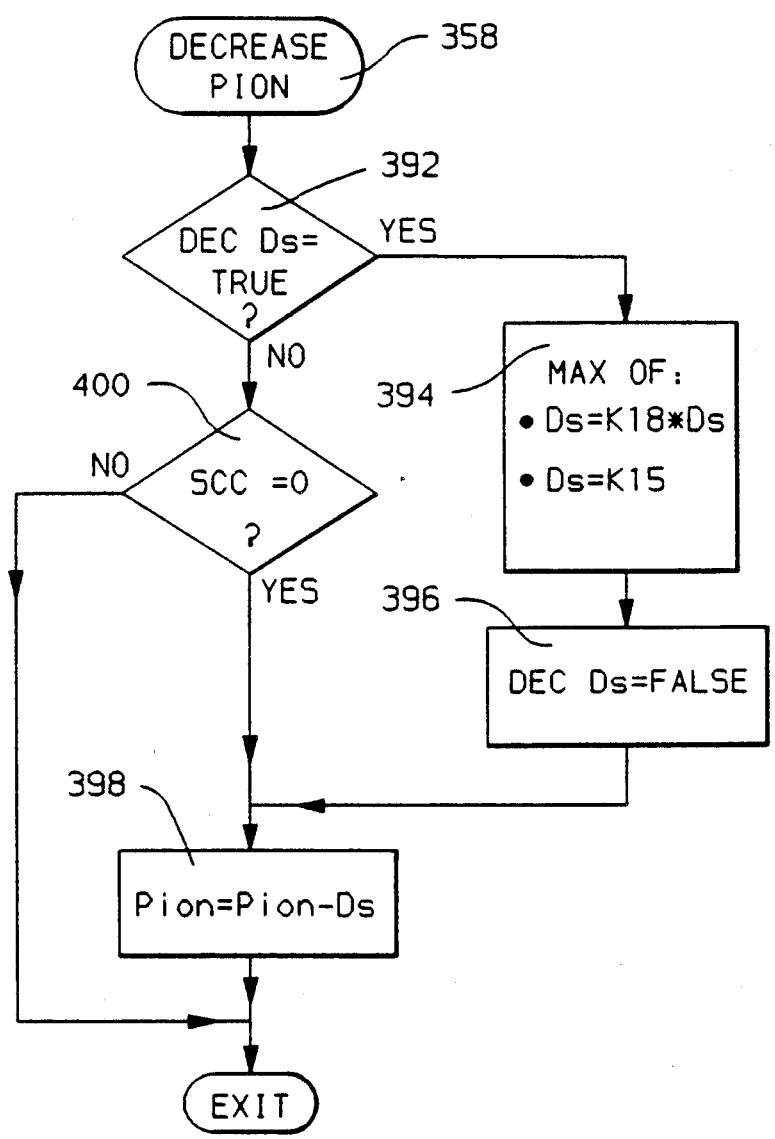
FIGS. 16 and 17 are flow diagrams for respectively decreasing and increasing the initial on-coming pressure to carry out the process shown in FIG. 15, according to the invention.

The Decrease Pion routine 358 shown in FIG. 16 uses a flag DEC Ds which is set to TRUE when Ds may be decreased. If DEC Ds is TRUE <392>, Ds is set to the larger of (K18 * Ds) or K15 <394> and DEC Ds is set to FALSE <396>. Then Pion is set to (Pion−Ds) <398>. If DEC Ds is not TRUE at block 392, and SCC is not zero <400>, the program exits, but if SCC is zero, the program goes to block 398 to decrease the pressure Pion.

Figure 17:
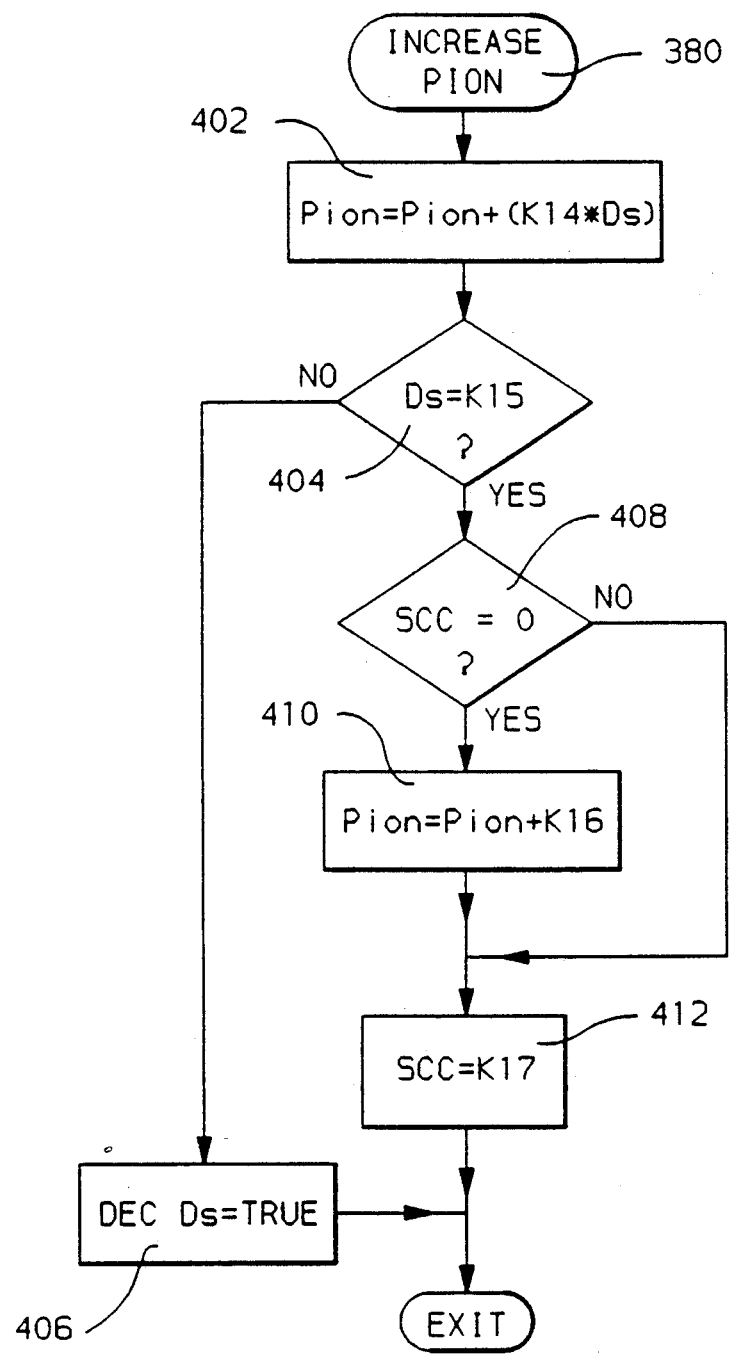

The Increase Pion routine 380 shown in the flow diagram of FIG. 17 first increases the pressure by setting $Pion = Pion + (K14 * Ds)$ <402>, and if Ds does not equal K15 <404>, the flag DEC Ds is set to TRUE <406>. If Ds = K15 and SCC = 0 <408>, Pion is increased by K16 <410> and SCC is set to K17 <412>. If SCC is not zero, the pressure increase is bypassed.

Figure 18:
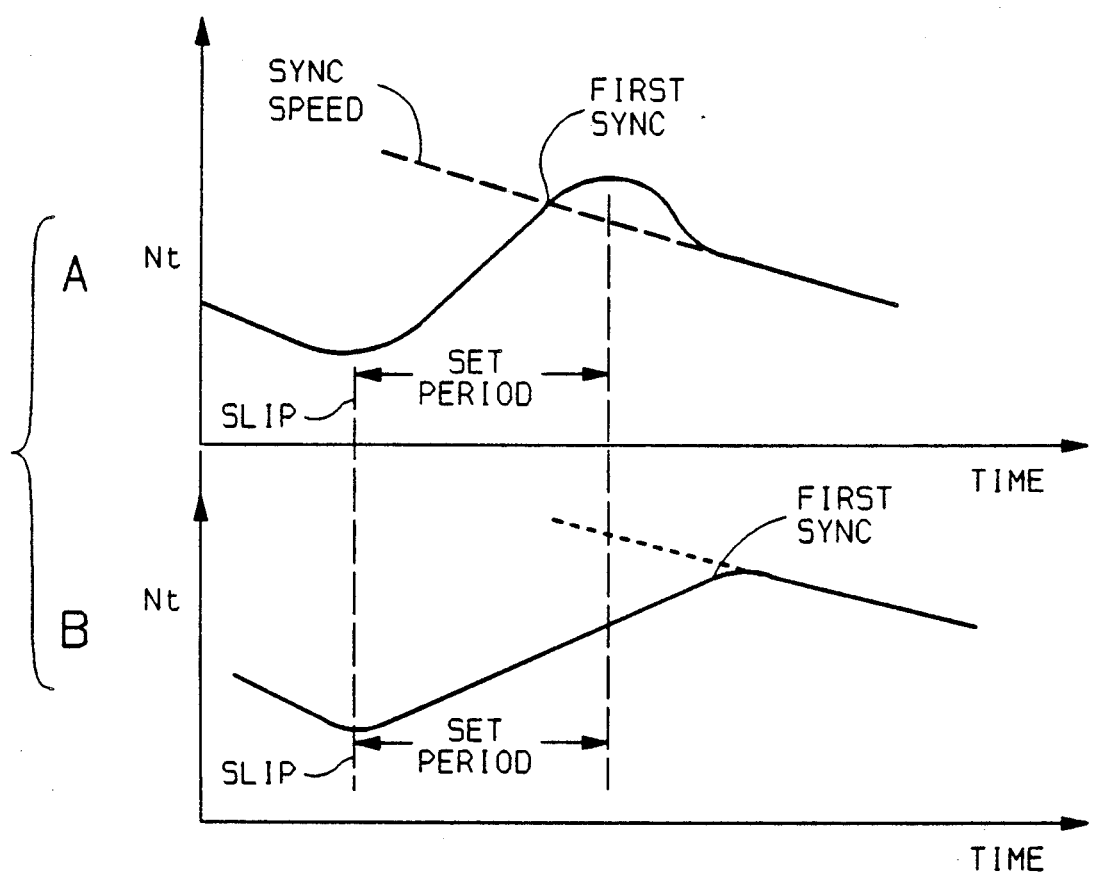
FIG. 18, graphs A and B, are turbine speed curves for the cases of a short converter shift and all other shifts, respectively.

In most cases (for long converter shifts and lock-up shifts), the iterative method will adjust the initial pressure Pion so that the turbine speed will conform to the pattern shown in FIG. 18, graph B, except for occasional excursions into flare territory after sync is attained. For such shifts, the first sync is detected after the set period which starts at off-going clutch slip.

In the case of a short converter shift, which occurs for downshifts between certain ranges, the first sync is detected within the set period. In those shifts, there is insufficient time in the closed-loop control period for the off-going clutch to achieve the capacity to hold synchronism, and flare results as shown in graph A of FIG. 18. By defining the TURBINE FLARE flag for the short converter shift condition according to the detection of flare only after several sync or past sync detections, the actual flare is extended or allowed to occur for a limited duration without setting the FLARE flag. The result is that the FIG. 18, graph A turbine speed pattern is the normal adapted condition for a short converter shift.

While this invention has been described in reference to the illustrated embodiments, various modifications will occur to those skilled in the art, and controls incorporating such modifications may fall within the scope of this invention which is defined by the appended claims.

The embodiments of the invention in which an exclusive property or privilege is claimed are defined as follows:

1. In a vehicular automatic transmission having an input and an output, a turbine connected to the input to couple driving torque thereto, in which a powered downshift from one transmission speed ratio to another is carried out through concurrent disengagement of an off-going fluid pressure operated torque transmitting device associated with the lower of such speed ratios and engagement of an on-coming fluid pressure operated torque transmitting device associated with the higher of such speed ratios, and further having turbine and output speed sensing means, a method of adaptively controlling initial conditions in the torque transmitting devices to achieve a high quality shift when shifting under power from the lower speed ratio to the higher speed ratio comprising the steps of:
   commanding an initial pressure on the on-coming torque transmitting device for filling the on-coming torque transmitting device and thereafter commanding a progressive increase of such pressure,
   commanding a progressively decreasing pressure on the off-going torque transmitting device to permit slip thereof,
   initiating a closed-loop control period of the off-going torque transmitting device whereby flare occurs at the end of the closed-loop period when the initial on-coming pressure command is below a threshold,
   detecting flare at the end of the closed-loop control period,
   iteratively adjusting the initial on-coming pressure toward the threshold in subsequent shifts by increasing said initial pressure when flare is detected and decreasing said initial pressure when flare is not detected, the increasing and decreasing of initial pressure being implemented in progressively smaller step amounts, whereby the initial pressure varies by small amounts from the threshold pressure.

2. The invention as defined in claim 1 wherein the step of iteratively adjusting the initial on-coming pressure toward the threshold in subsequent shifts comprises decreasing said initial pressure by step amounts when no flare is detected, increasing the initial pressure when flare is detected, decreasing the initial pressure by successively smaller step amounts when no flare is detected following an initial pressure increase, and continuing the iteration until a predefined minimum step amount is reached.

3. The invention as defined in claim 2 wherein the step of decreasing the initial pressure by smaller step amounts includes decreasing the previous step amount by a fixed percentage.

4. The invention as defined in claim 2 including maintaining the adjustment by the subsequent steps of :
   when the minimum step amount is reached and flare is detected, increasing the initial pressure by a set amount to raise the initial pressure above the threshold, and
   inhibiting further adjustments for a predefined number of shifts.

5. The invention as defined in claim 4 wherein the step of inhibiting further adjustments comprises the steps of:
   setting a counter to a preset value,
   decrementing the counter at each subsequent shift, and
   inhibiting further adjustments until the counter is decremented to zero.

6. The invention as defined in claim 1 including the steps of:
   detecting an increase in the off-going pressure command in excess of a predetermined amount during the closed-loop control period,
   when such an increase is detected, adaptively increasing a stored parameter following completion of the downshift, the parameter being effective to set the initial closed-loop pressure to a value which minimizes the off-going pressure increase during the closed-loop period, and the parameter increase being based on the amount of off-going pressure command increase during the closed-loop period.

7. The invention as defined in claim 1 including the steps of:
   detecting a decrease in the off-going pressure command in excess of a predetermined amount during the closed-loop control period,
   when such a decrease is detected, adaptively decreasing a stored parameter following completion of the downshift, the parameter being effective to set the initial closed-loop pressure to a value which minimizes the pressure decrease during the closed-loop period, and the parameter decrease being based on the amount of off-going pressure command decrease during the closed-loop period.

8. The invention as defined in claim 1 including the steps of:
   establishing a desired time of slip in the off-going torque transmitting device,
   commanding an initial pressure on the off-going torque transmitting device at shift initiation,
   detecting when slip in the off-going torque transmitting device occurs within a given time after shift initiation,
   when such a slip occurrence is detected, adaptively increasing a stored parameter following completion of the downshift, the parameter being effective to increase the initial off-going pressure to a value which causes the said slip to occur essentially at the desired time.

9. The invention as defined in claim 8 including the steps of:
   extrapolating to a pressure which would occur at the desired time of slip if the pressure command continued to decrease at the same rate to the desired time, the extrapolation being based on the rate of decreasing pressure, the off-going pressure command at the time of slip, and the desired time of slip,
   calculating the difference between the extrapolated pressure and the pressure at the actual time of slip, and
   increasing the stored parameter sufficiently to increase the initial off-going torque transmitting device pressure command by the amount of the calculated difference.

10. The invention as defined in claim 1 including the steps of:

commanding an initial pressure on the off-going torque transmitting device at shift initiation, establishing a desired slip time, detecting when slip in the off-going torque transmitting device occurs within a given time after shift initiation, determining when such slip fails to occur within the said given time, when such a slip fails to occur within the given time, adaptively decreasing a stored parameter following completion of the downshift, the parameter being effective to decrease the initial off-going pressure to a value which causes the said slip to occur essentially at the desired time.

11. The invention as defined in claim 10 wherein the step of decreasing a stored parameter comprises the steps of:

calculating the difference between the pressure command which occurred at the desired slip time and the pressure command at the time of slip, and decreasing the stored parameter sufficiently to decrease the initial off-going pressure command by the amount of the calculated difference.

12. The invention as defined in claim 1 wherein the step of detecting flare at the end of the closed-loop control period comprises:

detecting flare for a short converter shift condition by sensing flare after on-coming clutch synchronization or past synchronization is detected a preset number of times, where a short converter shift condition is defined by the transmission being in converter mode and the time from off-going clutch slip to the first synchronization is less than a set value, and detecting flare for conditions other than short converter shift by sensing flare after on-coming clutch synchronization is detected one time, whereby the increase of initial pressure is delayed for the short converter shift condition so that extended flare is allowed.

* * * * *